United States Patent [19]
Horton et al.

[11] Patent Number: 5,855,394
[45] Date of Patent: Jan. 5, 1999

[54] MOTOR VEHICLE FRAME ASSEMBLY AND METHOD OF FORMING THE SAME

[75] Inventors: Frank A. Horton, Rochester Hills, Mich.; Kenneth B. Jacobs, Spring Grove, Pa.; Jason D. Jacobs, Rochester Hills, Mich.; Howard A. Mayo, III, Airville, Pa.

[73] Assignee: Cosma International Inc., Ontario, Canada

[21] Appl. No.: 912,004

[22] Filed: Aug. 15, 1997

Related U.S. Application Data

[60] Division of Ser. No. 616,743, Mar. 15, 1996, Pat. No. 5,718,048, which is a continuation-in-part of Ser. No. 314,496, Sep. 28, 1994, Pat. No. 5,561,902.

[51] Int. Cl.$^6$ ........................................... B62D 21/00
[52] U.S. Cl. ..................... 280/781; 280/784; 280/785; 280/790; 280/800; 296/204
[58] Field of Search ................................. 280/781, 784, 280/785, 790, 798, 800, 797; 296/204

[56] References Cited

U.S. PATENT DOCUMENTS

| | | | |
|---|---|---|---|
| 1,698,179 | 1/1929 | Walker | 280/790 |
| 2,009,963 | 7/1935 | Matthaei . | |
| 2,127,618 | 8/1938 | Riemenschmeider . | |
| 2,136,122 | 11/1938 | Almdale | 280/797 |
| 2,227,615 | 3/1941 | Townsend . | |
| 2,669,462 | 2/1954 | Toncray et al. | 280/785 |
| 2,784,983 | 3/1957 | Dean . | |

(List continued on next page.)

FOREIGN PATENT DOCUMENTS

| | | |
|---|---|---|
| 626852 | 9/1961 | Canada . |
| 0 294 034 | 12/1988 | European Pat. Off. . |
| 816 688 | 7/1949 | Germany . |
| 56-77004 | 7/1981 | Japan . |
| 3-285713 | 12/1991 | Japan . |
| 1538962 | 1/1990 | U.S.S.R. . |

OTHER PUBLICATIONS

Ebbinghaus et al, "Gesenkschmiede mit neuer Technologie", Carl Hanser Verlag, Munchen 1989, 6 pages in German, plus 15 page English translation Die–forging With New Technology.

Ebbinghaus, "Wirtschaftliches Konstruieren mit innenhoch–druck–umgeformten Prazisions–Werkstucken", Carl Hanser Verlag, Munchen 1990, 3 pages in German, plus 6 page English translation Efficient Designing with Precision Components Formed by the Internal High–Pressure Technique.

(List continued on next page.)

*Primary Examiner*—Eric D. Culbreth
*Attorney, Agent, or Firm*—Cushman Darby & Cushman IP Group of Pillsbury Madison & Sutro LLP

[57] ABSTRACT

A frame assembly for a motor vehicle and method of manufacturing the same. The method includes the steps of: forming a rearward frame module, forming a forward frame module, and forming a central frame module including a pair of longitudinal central frame siderails. Each of the central frame siderails are constructed by 1) forming a sheet of metallic material into a longitudinal member having a generally U-shaped transverse cross section including a base portion and a pair of leg portions, 2) engaging opposite longitudinal ends of the longitudinal member and pulling the longitudinal ends in opposite directions with respect to the longitudinal extent of the longitudinal member in order to stretch the longitudinal member so that the metallic material forming the longitudinal member reaches its yield state; and 3) bending the longitudinal member having the U-shaped cross-section at two longitudinally spaced locations so that 1) at a first of the locations a) the base portion is bent generally within its plane, b) one of the leg portions is stretched, and c) an opposite one of the leg portions is compressed, and so that 2) at a second of the locations a) the base portion is bent generally within its plane, b) the one of the leg portions is compressed, and c) the opposite one of the leg portions is stretched. The forward frame module and the rearward frame module are then to opposite ends of the central frame module.

13 Claims, 13 Drawing Sheets

5,855,394
Page 2

U.S. PATENT DOCUMENTS

| | | |
|---|---|---|
| 2,901,266 | 8/1959 | Lindsay . |
| 3,156,034 | 11/1964 | Gruetjen . |
| 3,173,196 | 3/1965 | Grimm . |
| 3,201,861 | 8/1965 | Fromson et al. . |
| 3,406,439 | 10/1968 | Hutchens . |
| 3,595,057 | 7/1971 | MacKenzie . |
| 3,597,955 | 8/1971 | MacKenzie . |
| 3,805,576 | 4/1974 | Brauer . |
| 3,860,258 | 1/1975 | Feustel et al. ............................ 280/784 |
| 3,902,350 | 9/1975 | McManus . |
| 3,908,435 | 9/1975 | Bowman, Jr. et al. . |
| 4,147,379 | 4/1979 | Winslow . |
| 4,355,844 | 10/1982 | Fantini Muzzarelli ................. 280/784 |
| 4,386,792 | 6/1983 | Moore et al. . |
| 4,567,743 | 2/1986 | Cudini . |
| 4,698,995 | 10/1987 | Chorneau . |
| 4,747,292 | 5/1988 | Chorneau . |
| 4,803,878 | 2/1989 | Moroney . |
| 4,815,308 | 3/1989 | Moroney . |
| 4,827,753 | 5/1989 | Moroney . |
| 4,989,439 | 2/1991 | Ewert et al. . |
| 5,070,717 | 12/1991 | Boyd et al. . |
| 5,107,693 | 4/1992 | Olszewski et al. . |
| 5,114,169 | 5/1992 | Botkin et al. . |
| 5,149,132 | 9/1992 | Ruehl et al. ............................ 280/785 |
| 5,233,854 | 8/1993 | Bowman et al. . |
| 5,239,852 | 8/1993 | Roper . |
| 5,308,115 | 5/1994 | Ruehl et al. . |
| 5,327,764 | 7/1994 | Weykamp et al. . |
| 5,333,775 | 8/1994 | Bruggemann et al. . |
| 5,339,667 | 8/1994 | Shah et al. . |
| 5,349,839 | 9/1994 | Weykamp et al. . |
| 5,353,618 | 10/1994 | Roper et al. . |
| 5,357,774 | 10/1994 | Klages et al. . |
| 5,445,002 | 8/1995 | Cudini et al. . |
| 5,561,902 | 10/1996 | Jacobs et al. ........................... 280/785 |
| 5,718,048 | 2/1998 | Horton et al. ......................... 280/785 |

OTHER PUBLICATIONS

Ebbinghaus et al, "Prazisions–Werkstucke in Leichtbauweise, hergestellt durch Innenhochdruck–Umformen", Metallumtoform–Technik, pp. 15–19, (German), plus 5 page English translation, Precision Workpieces in Lightweight Construction Manufactured by Internal High Pressure Shaping, from Metallumform–Technik, the magazine for applied metal shaping.

Ebbinghaus, "Innenhochdruckumformung: Hohlteile material–sparend hergestellt", Sonderdruck aus dem Industrie–Anzeiger, Nr. 20 vom 9.3.1984, Gesenkschmiede Schneider GmbmH Aalen (4 pages in German), plus 11 page English translation, Internal High Pressure Shaping: Hollow Parts Produced in a Material Saving Manner, published in a special printing from INDUSTRIE–ANZEIGER No. 20.

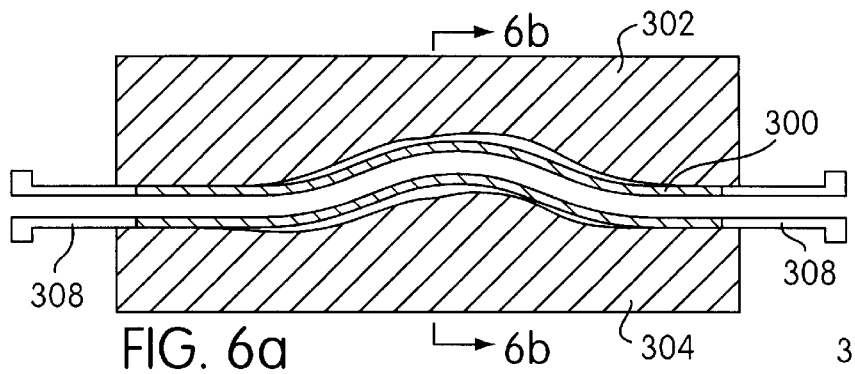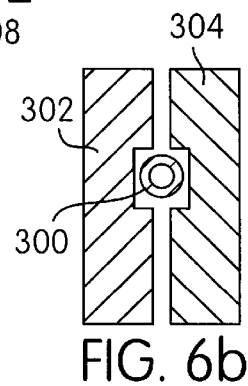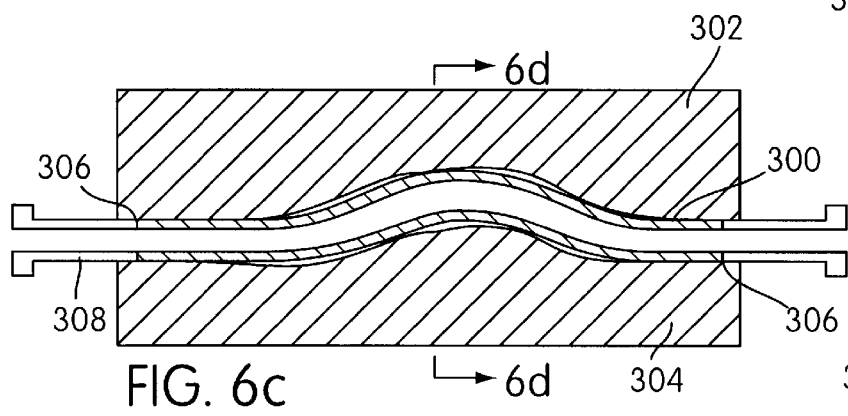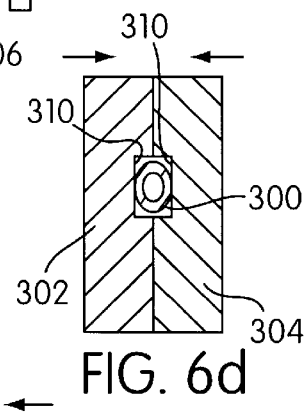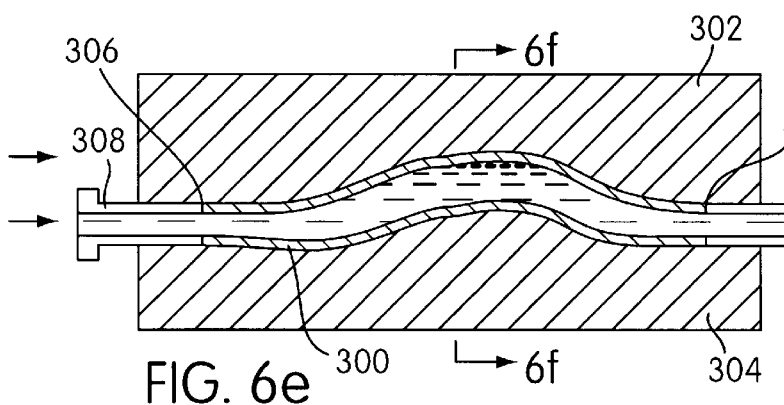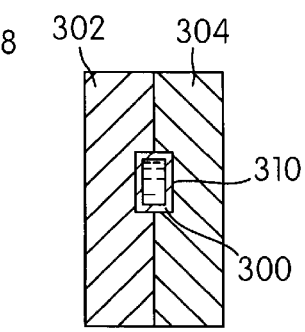

MOTOR VEHICLE FRAME ASSEMBLY AND METHOD OF FORMING THE SAME

This is a division of application Ser. No. 08/616,743, filed Mar. 15, 1996, now U.S. Pat. No. 5,718,048 which is a continuation-in-part of U.S. application Ser. No. 08/314,496, filed Sep. 28, 1994, now U.S. Pat. No. 5,561,902.

BACKGROUND OF THE INVENTION

The present invention relates to ladder frame assemblies for motor vehicles and methods of forming the same.

In the field of motor vehicles, especially off road vehicles, pick-up trucks and similar vehicles, it has been known to provide a vehicle ladder frame assembly for mounting various components of the vehicle, such as the body, engine, suspension system, etc. Typically, the frame assembly includes a pair of lengthwise parallel siderails generally extending along opposite sides of the vehicle, and a plurality of transverse cross members interconnecting the siderails at spaced positions therealong. The frame assembly acts as the main load carrying member for rigidity and strength, as opposed to the vehicle body members of the "uni-body" construction that are typically used in standard passenger cars.

In more recent years, vehicle frame assemblies have been manufactured with added modularity. More specifically, the vehicle frame assemblies may be conveniently divided into a forward frame module, central frame module, and a rearward frame module. This facilitates manufacture and permits certain frame modules to be used with more than one type or model vehicle. Moreover, modular design has the advantage that different portions of the frame assembly can be manufactured with different constructions. For example the forward frame module is preferably manufactured with closed bar siderails (i.e., having a closed transverse cross-sectional configuration) to provide the frame assembly with maximized strength for crashworthiness and torsional rigidity under the cab. The central and rear frame modules, on the other hand, are preferably manufactured with siderails having a U-shaped transverse cross sectional configuration, which includes a base portion and a pair of leg portions extending in generally parallel relation from opposite transverse ends of the base portion. The opened portion of the U-shaped configuration faces inwardly towards the center of the vehicle to best accommodate the slight flexure of the frame during vehicle operation and to facilitate mounting of cross members and other components. As used herein, the term U-shaped may be synonymous with a "C-shaped" configuration, with the "C-shaped" terminology referring to a more specific U-shaped configuration in which inwardly extending flanges are provided at the opposite ends of the U-shaped configuration.

In producing vehicle frame assemblies, manufacturers typically employ a stamping technique. Stamping is accomplished by utilizing one or more opposing stamping die members which compress (by impact) a sheet of raw metal, usually steel, therebetween to form frame siderails and cross members of a desired shape (e.g., having the U-shaped cross sectional configuration). During the stamping process, the raw material is sequentially moved and stamped in different stamping die stations until the final shape is achieved. Stamping operations are advantageous in some respects, such as its ability to provide a relatively simple means for forming components with a non-uniform or varying cross-sectional configuration. However, the stamping dies and equipment are relatively expensive and must be replaced on a frequent basis. As a result, it can be appreciated that material, labor and equipment costs associated with manufacturing and assembly of stamped frame members is significant.

Another problem associated with stamping is that a significant amount of raw material is wasted, especially where irregularly shaped frame parts are required. More specifically, where irregular shapes are to be stamped from a sheet of raw metal, there is a significant amount of peripheral material (particularly at the side edges of the sheet) that cannot be used, irrespective of how closely the stamped shapes are nested on the sheet. In one analysis, it was found that up to 30%–40% of a roll of raw material could not be used due to the irregular shape of the stamped part. It can be appreciated that, at high volumes, the amount of material wasted, and costs associated therewith, is significant in the stamping method.

Another problem with stamping exists in the assembly of the stamped members into a frame assembly. This is typically done using a wire weld process that applies significant heat to the parts. During the assembly process, the stamped parts must be clamped into position to control the tendency thereof to spring back slightly towards its original shape due to the memory contained in the metal grains, and to control the stresses that are created during the heating and the forming processes. Without clamping, these stresses might result in significant distortion of the assembly (6–12 mm overall are typical). Thus, the assembly and tooling at high volumes results in high investment, manufacturing costs, and rework costs to obtain a quality assembly.

The patent literature has proposed a procedure in which an entire frame siderail is roll-formed rather than stamped. More specifically, in U.S. Pat. No. 2,127,618 (hereinafter "the '618 patent), there is proposed an apparatus which passes a sheet of raw metal material through a series of cooperative rollers which sequentially bend the sheet into a tubular frame member having a box-shaped transverse cross sectional configuration. Roll forming offers numerous advantages over stamping. For example, capital expenditures required for manufacturing equipment is significantly lower. In addition, because roll forming machines function without the stresses of high impact associated with stamping dies, they require less maintenance and have a longer useful life. Furthermore, because a sheet of material can be continuously passed through the series of rollers, frame siderail production times are faster. Additionally, because a sheet (typically contained in a roll; see the '618 patent) of raw material can be used completely in making a siderail, little or no raw material is wasted. Assembly is minimized as the sheet is formed, during the rolling process, into a complete closed box section. It can also be appreciated, therefore, that manufacturing costs associated with roll forming is significantly less than with stamping.

The benefits of roll forming, however, have heretofore been limited by the process' inability to form siderail frame members of any desired shape. For example, in the most desirable configuration, it is advantageous not only to provide the central siderail frame members with a U-shaped cross sectional configuration as aforesaid, but it is also desirable to provide the central portion of the siderail with bends in a vertical direction, for example, to accommodate axle mountings for the rear wheels. Since, unlike stamping, the roll forming process can form only a straight siderail member (e.g., without any bending in the vertical direction), any vertical bends must be accomplished in a subsequent operation. For example, the aforementioned '618 patent contemplates that after formation, the straight box sectioned siderail can be bent in a bending mill to provide forward and rear kickup. While it is relatively simple to bend box-shaped cross sectional configuration because of its inherent strength, heretofore attempts at bending a roll-formed siderail member having a U-shaped configuration have been commercially unsuccessful. More specifically, such attempts have been ineffective due to the relative weakness of an opened section configuration and its susceptibility to unwanted twisting and distortion.

There has thus been a need to manufacture a frame assembly for an automobile that addresses the concerns noted above. It is therefore an object of the present invention to meet this need. In accordance with the principles of the present invention this objective is achieved by providing a method for manufacturing a ladder frame assembly for a motor vehicle. Two of the steps of the method of the present invention comprise forming a rearward frame module and forming a forward frame module. Another step is forming a central frame module comprising a pair of longitudinal central frame siderails, each of the central frame siderails being formed by 1) moving a sheet of metallic material through a series of cooperating rollers so that opposite sides of the sheet are rollingly engaged by the rollers in a manner which bends the sheet to form a longitudinal member having a generally U-shaped transverse cross section including a base portion and a pair of leg portions extending in generally parallel relation to one another from opposite ends of the base portion, and 2) bending the longitudinal member having the U-shaped cross-section so that i) the base portion is bent generally within its plane, ii) one of the leg portions extending from one end of the base portion is stretched, and iii) an opposite one of the leg portions extending from an opposite end of the base portion is compressed. A final step of the method is rigidly securing the front frame module and the rearward frame module to opposite ends of the central frame module.

The forward frame module comprises a pair of front frame siderails which preferably have a closed cross-sectional configuration. Where closed box frame parts are to be manufactured (e.g., at forward portions of the frame which absorb crash energy), stamping becomes even more problematic since a single integrally formed tubular member cannot be stamped. Instead, where tubular frame parts are required, it is necessary to stamp a plurality of elongated sections which must be longitudinally welded. For example, two facing U-shaped sections may be welded into a box-like sectional configuration. Such a construction is not as strong or dimensionally accurate as one in which an integrally formed tubular member is employed. It can also be appreciated that this stamping and welding process requires even further resources, such as welding material and additional man-hours to complete the weld.

It should be noted that roll forming can be used to manufacture a tubular member for the forward portion of the siderail. For example, to form the box-shaped configuration noted in the aforementioned '618 patent, it is necessary to roll the side edges of the strip material into the squared cross-sectional shape until the side edges of the strip material are brought into abutting relation and then welded. More recently, however, it has been proposed to integrally form a box-like tubular frame member from a tubular blank in what is known as a hydroforming process. See, example, U.S. Pat. Nos. 5,107,693, 5,233,854, 5,333,775, 4,567,743, 5,070, 717, 5,239,852 and 5,339,667. While hydroformed frame members are highly advantageous for the forward portions of the siderail frame assembly, heretofore, the related art has not provided a modular frame assembly which employs the particular advantages of utilizing the hydroforming process for the forward frame siderail members and employs the particular advantages of the roll forming and bending processes for forming central frame siderail having a U-shaped cross-sectional configuration members.

In accordance with the principles of the present invention each of the front frame siderails are preferably formed by 1) placing a metallic tubular member into a cavity of a die mold, the die mold having an interior surface defining a shape of the cavity, and 2) providing a fluid interiorly to the metallic tubular member with sufficient pressure so as to expand the tubular member outwardly into engagement with the interior surface of the die mold to substantially conform the tubular member to the shape of the cavity.

The hydroforming procedure for forming the front frame module of the present invention shapes a pair of tubular blanks into the front frame siderails. Fluid pressure is applied to the interior of each blank to expand the blank. As a further advantage in accordance with the present invention, the ends of the blank are pushed inwardly during the hydroforming process to obtain material flow of metal so that the wall thickness of the expanded tube is maintained within ±10% of the original blank.

The present invention also achieves its objective by providing a frame assembly for a motor vehicle comprising a rearward frame module having a pair of generally parallel longitudinally extending rearward frame siderails, a forward frame module having a pair of generally parallel tubular forward frame siderails, and a central frame module having a pair of generally parallel longitudinally extending central frame rail members each having a generally U-shaped transverse cross-sectional configuration including a base portion and a pair of generally parallel leg portions extending from opposite transverse ends of the base portion. The U-shaped central frame members are each bent at two longitudinally spaced locations so that at a first of the locations the base portion is bent generally within its plane, one of the leg portions extending from one transverse end of the base portion is substantially stretched, and an opposite one of the leg portions extending from an opposite transverse end of the base portion is substantially compressed, and so that at a second of the locations the base portion is bent generally within its plane, the one of the leg portions extending from one end of the base portion is substantially compressed, and the opposite one of the leg portions extending from the opposite transverse end of the base portion is substantially stretched. The central frame module has respective forward ends of each of the central frame siderails connected with respective rear ends of each of the forward frame siderails, and has respective rearward ends of each of the central frame siderails connected with respective forward ends of the rearward frame siderails.

While in the present invention it is preferable for the central frame module to include longitudinal central siderails each formed into a substantially straight longitudinal member having a U-shaped cross-sectional configuration that is subsequently bent to accommodate axle mounting for rear wheels, different advantageous techniques for bending the central frame siderails are available. More particularly, in the instance in which the longitudinal member having the U-shaped cross-section is bent without making some other accommodation, there is a tendency for the longitudinal member to exhibit a slight spring-back toward its original configuration. As noted previously, such spring-back is caused by the memory retained in the grains of metallic material forming the longitudinal member. In order to accommodate this spring-back, it is necessary to overcompensate during the bending operation so that the longitudinal member having the U-shaped cross-section is bent slightly beyond its desired retention point. The slight springback brings the longitudinal member to its approximate desired configuration. It can be appreciated that it is somewhat difficult to approximate with accuracy the amount of overcompensation necessary to provide a part of the desired construction.

It is, therefore, an object of the present invention to address the concerns noted above. In accordance with this object, there is provided a method for manufacturing a frame assembly for a motor vehicle, comprising the steps of forming a rearward frame rail module having a pair of laterally spaced elongated rearward frame siderails extending in the fore-aft direction of the frame-assembly; forming a forward frame rail module having a pair of laterally spaced elongated forward frame siderails extending in the fore-aft direction of the frame assembly; forming a central frame rail module comprising a pair of longitudinal central frame siderails, each of the central frame siderails being constructed by forming a sheet of metallic material into a longitudinal member having a generally U-shaped transverse cross section including a base portion and a pair of leg portions extending in generally parallel relation to one another from opposite transverse ends of the base portion; engaging opposite longitudinal ends of the longitudinal member and pulling the longitudinal ends in opposite directions with respect to the longitudinal extent of the longitudinal member in order to stretch the longitudinal member longitudinally so that the metallic material forming the longitudinal member reaches its yield state; and bending the longitudinal member having the U-shaped cross-section at two longitudinally spaced locations so that 1) at a first of the locations the base portion is bent generally within its plane, one of the leg portions extending from one end of the base portion is stretched, and an opposite one of the leg portions extending from an opposite end of the base portion is compressed, and so that 2) at a second of the locations the base portion is bent generally within its plane, the one of the leg portions extending from one end of the base portion is compressed, and the opposite one of the leg portions extending from an opposite end of the base portion is stretched; and rigidly securing the forward frame rail module and the rearward frame rail module to opposite ends of the central frame rail module by 1) securing a forward end of each of the central frame siderails with a rear end of a respective one of the forward frame siderails, and 2) securing a rearward end of each of the central frame siderails with a front end of a respective one of the rear frame siderails.

It has been found that this methodology not only inhibits spring-back to allow the siderail to be manufactured more easily, but also reduces the amount of metal that is required as a result of the stretching operation, thus providing for a material cost savings.

It is a further object of the invention to provide a method of manufacturing a modular frame assembly which employs the aforementioned stretch bending technique for the central frame siderails, which employs a stamping technology for the rear frame siderails to accommodate for an irregular configuration of the rear frame siderails, and which employs a hydroforming technology for the forward frame siderails to accommodate for a high-strength and economical fabrication of the forward frame siderails; thus providing for an optimized modular frame assembly. In accordance with the object, there is provided a method of manufacturing a frame assembly for a motor vehicle, comprising the steps of (A) forming a rearward frame module having a pair of laterally spaced, longitudinally extending rear frame siderails, each of the rear frame siderails having a generally U-shaped transverse cross section including a rear siderail base portion and a pair of rear siderail leg portions extending in generally parallel relation to one another from opposite transverse ends of the rear siderail base portion, the rear siderail base portion having a greater length between the transverse ends at a forward portion thereof relative to the length between the transverse ends at a rearward portion thereof, the rear frame siderails each being formed by i) placing the sheet of metallic material between cooperative stamping dies, and ii) compressively engaging opposite sides of the sheet with the stamping dies so as to provide the sheet with the U-shaped transverse cross section; B) forming from a sheet of metallic material a central frame module having a pair of laterally spaced, longitudinally extending central frame siderails, each of the central frame siderails having a generally U-shaped transverse cross section including a central siderail base portion and a pair of central siderail leg portions extending in generally parallel relation to one another from opposite transverse ends of the central siderail base portion, each of the central frame siderails being formed by i) forming the sheet of metallic material into a longitudinal member having a generally U-shaped transverse cross section including the base portion and the pair of leg portions extending in generally parallel relation to one another from opposite transverse ends of the base portion, ii) engaging opposite longitudinal ends of the longitudinal member and pulling the longitudinal ends in opposite directions with respect to the longitudinal extent of the longitudinal member in order to stretch the longitudinal member longitudinally so that the metallic material forming the longitudinal member reaches its yield state; and iii) bending the longitudinal member having the U-shaped cross-section at two longitudinally spaced locations so that 1) at a first of the locations a) the base portion is bent generally within its plane, b) one of the leg portions extending from one end of the base portion is stretched, and c) an opposite one of the leg portions extending from an opposite end of the base portion is compressed, and so that 2) at a second of the locations a) the base portion is bent generally within its plane, b) the one of the leg portions extending from one end of the base portion is compressed, and c) the opposite one of the leg portions extending from an opposite end of the base portion is stretched, the longitudinal member thus being bent to conform to the desired configuration of one of the central frame sidrails; C) forming from a metallic tubular member a forward frame module having a pair of laterally spaced, longitudinally extending tubular forward frame siderails, each of the forward frame siderails being formed by: i) placing the metallic tubular member into a cavity of a die mold, the die mold having an interior surface defining a shape of the cavity, ii) providing a fluid interiorly to the metallic tubular member with sufficient pressure so as to expand the tubular member outwardly into peripheral engagement with the interior surface of the die mold to substantially conform the tubular member to the shape of the cavity, iii) applying force to opposite ends of the tubular member so as to cause the ends to be moved generally inwardly towards an intermediate portion of the tubular member while the tubular member is being expanded so as to maintain a wall thickness of the tubular member within a specified range; and D) rigidly securing the rearward frame module and the forward frame module to opposite respective ends of the central frame module by i) securing rearward portions of the forward frame siderails to forward portions of the central frame siderails, and ii) securing the forward portions of the rearward frame siderails, each having the base portion with the relatively greater length between transverse ends, to rearward portions of the central frame siderails.

It is a further object of the present invention to provide a method of manufacturing a frame assembly which employs a stamping technique for forming central frame siderails that are bent within the vertical fore-aft plane to accommodate for the rear wheel axles, which stamping technique is economical in that it is not subject to the aforementioned problems associated with wasted raw material. To achieve this objective, the present invention provides a method of manufacturing a frame assembly for a motor vehicle comprising the steps of: forming a rearward frame module having a pair of laterally spaced elongated rearward frame siderails extending in the fore-aft direction; forming a forward frame module having a pair of laterally spaced elongated forward frame siderails extending in the fore-aft direction of the frame rail assembly; forming a central frame module comprising a pair of longitudinal central frame siderails, each of the central frame siderails being constructed by 1) bending an elongated planar sheet of metallic material transversely within its plane ii) placing the planar sheet of metallic material between cooperative stamping dies after is has been bent within its plane; iii) compressively engaging opposite sides of the planar sheet with the stamping dies so as to form the sheet into a longitudinal member having a generally U-shaped transverse cross section; and rigidly securing the forward frame module and the rearward frame module to opposite ends of the central frame rail module by 1) securing a forward end of each of said central frame siderails with a rear end of a respective one of said forward frame siderails, and 2) securing a rearward end of each of said central frame siderails with a front end of a respective one of said rear frame siderails.

It is a further object of the invention to provide a method of manufacturing a modular frame assembly which employs the aforementioned economic stamping technique for the central frame siderails, which employs a stamping technology for the rear frame siderails to accommodate for an irregular configuration of the rear frame siderails, and which employs a hydroforming technology for the forward frame siderails to accommodate for a high-strength and economical fabrication of the forward frame siderails; thus providing for another optimized frame assembly embodiment. In accordance with this object, there is provided a method of manufacturing a frame assembly for a motor vehicle, comprising the steps of (a) forming from an elongated sheet of metallic material a rearward frame module having a pair of laterally spaced, longitudinally extending rear frame siderails, each of the rear frame siderails having a generally U-shaped transverse cross section including a rear siderail base portion and a pair of rear siderail leg portions extending in generally parallel relation to one another from opposite transverse ends of the rear siderail base portion, the rear siderail base portion having a greater length between the transverse ends at a forward portion thereof relative to the length between the transverse ends at a rearward portion thereof, the rear frame siderails each being formed by i) placing a sheet of metallic material between cooperative stamping dies; ii) compressively engaging opposite sides of the sheet with the stamping dies so as to provide the sheet with the U-shaped transverse cross section; b) forming from a planar sheet of metallic material a central frame module having a pair of laterally spaced, longitudinally extending central frame siderails, each of the central frame siderails having a generally U-shaped transverse cross section including a central siderail base portion and a pair of central siderail leg portions extending in generally parallel relation to one another from opposite transverse ends of the central siderail base portion, each of the central frame siderails being formed by i) bending said elongated planar sheet of metallic material transversely within its plane ii) placing the planar sheet of metallic material between cooperative stamping dies after is has been bent within its plane; iii) compressively engaging opposite sides of the planar sheet with the stamping dies so as to form the sheet into a longitudinal member having a generally U-shaped transverse cross section; and c) forming from a metallic tubular member a forward frame module having a pair of laterally spaced, longitudinally extending tubular forward frame siderails, each of the forward frame siderails being formed by: i) placing the metallic tubular member into a cavity of a die mold, the die mold having an interior surface defining a shape of the cavity, ii) providing a fluid interiorly to the metallic tubular member with sufficient pressure so as to expand the tubular member outwardly into peripheral engagement with the interior surface of the die mold to substantially conform the tubular member to the shape of the cavity, iii) applying force to opposite ends of the tubular member so as to cause the ends to be moved generally inwardly towards an intermediate portion of the tubular member while the tubular member is being expanded so as to maintain a wall thickness of the tubular member within a specified range, and d) rigidly securing the rearward frame module and the forward frame module to opposite respective ends of the central frame module by i) securing rearward portions of the forward frame siderails to forward portions of the central frame siderails, and ii) securing the forward portions of the rearward frame siderails, each having the base portion with the relatively greater length between transverse ends, to rearward portions of the central frame siderails.

These and other objects of the present invention will become more apparent during the course of the following detailed description and appended claims.

This invention may best be understood with reference to the accompanying drawings wherein illustrative embodiments are shown.

DETAILED DESCRIPTION OF THE DRAWINGS

FIG. 2c is a cross-sectional view taken along the line 2c—2c in FIG. 2a.

FIGS. 6a, 6c and 6e are longitudinal sectional views showing the hydroforming mold assembly and tubular blank used in forming the forward frame siderails in accordance with the principles of the present invention.

FIGS. 6b, 6d and 6f are transverse sectional views of FIGS. 6a, 6c and 6e, respectively, showing the hydroforming mold assembly and tubular blank used in forming the forward frame siderails in accordance with the principles of the present invention.

DETAILED DESCRIPTION OF THE PREFERRED EMBODIMENT OF THE INVENTION

Figure 1:
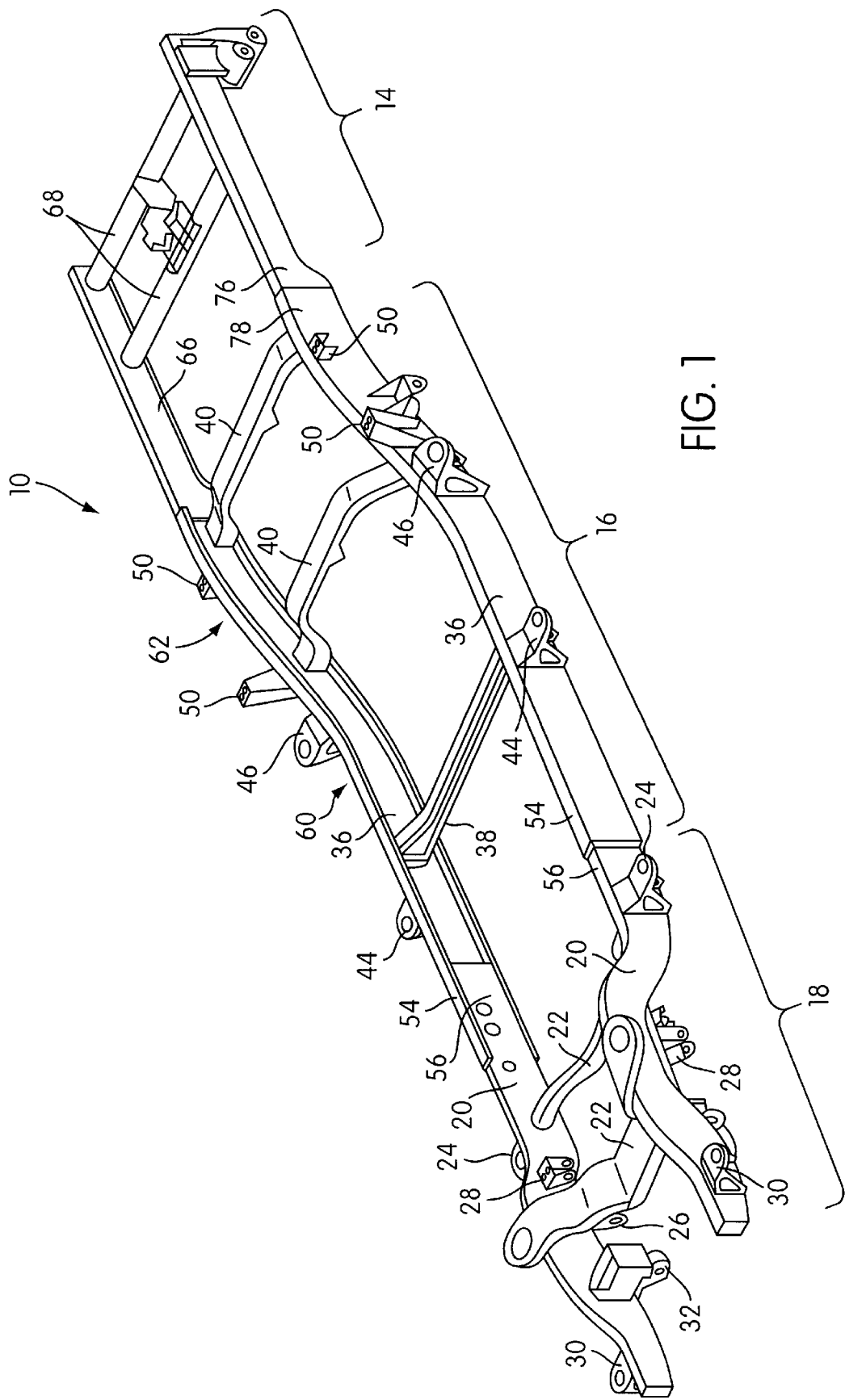
FIG. 1 is a perspective view showing the ladder frame assembly of the present invention.

In FIG. 1, there is shown generally a rail or ladder frame assembly 10 manufactured in accordance with the principles of the present invention. The frame assembly 10 is preferably modular in design and comprises a rearward frame module, generally indicated at 14, a central frame module, generally indicated at 16, and a forward frame module, generally indicated at 18. Each of the frame modules include a pair of laterally spaced, longitudinally extending frame "rail members" or "siderails", these terms being used interchangeably. For example, the forward frame module includes a pair of laterally spaced, longitudinally extending tubular forward frame rail members or siderails 20, each having a closed transverse cross-section, preferably rectangular in form so as to provide sufficient strength and support for crash energy management. The forward frame rail members 20 are interconnected by cross rail members 22, which are also preferably tubular in form for added torsional rigidity of the frame assembly. The forward frame module 18 is adapted to have numerous vehicle components mounted thereon. For example, the forward frame module includes body mounting brackets (for example, as indicated by numeral 24), rack and pinion steering brackets 26, engine mounting brackets 28, radiator support bracket 30 and a control arm (suspension mounting) bracket 32. As will be described in more detail later, the rail members or siderails of the forward frame module 18 are preferably formed in a hydroforming process, which allows the tubular forward frame rail members 20 to have a substantially equal wall thickness throughout. In addition, during the hydroforming process, it is not necessary to provide a longitudinal seam weld, so that the tubular members are integrally formed, and are stronger and superior dimensionally than those manufactured by stamping or roll forming which require such seam welds.

The central frame module 16 includes a pair of parallel central frame rail members or siderails 36 interconnected by cross-members, such as bearing support cross-member 38 and fuel tank cross-members 40. The central frame module also includes forward body mount brackets 44, rearward body mount brackets 46, and rear box mount brackets 50. The central frame rail members 36 are rigidly connected at their forward ends 54 to respective rearward ends 56 of the tubular forward frame rail members 20. Preferably, the rigid connection is accomplished by welding the ends to one another. It is also preferred that the central frame rail members 36 have a U-shaped transverse cross-section, with the opened portion of the U configuration facing inwardly towards the center of the frame assembly. This configuration for the rail members 36 allows various components to be easily mounted thereon, while also providing the central frame module 16 with substantial strength.

Central frame rail members 36 are formed first in a rolling operation to provide the U-shaped cross-sectional configuration, and then in a bending operation to give the rail members 36 slight forward and rearward vertical bends, indicated at 60 and 62, respectively. The longitudinally spaced forward and rearward bends 60 and 62 are provided to accommodate various components, such as wheel and axle mounts, rear load box, and the vehicle suspension. More particularly, the forward and rearward bends 60, 62 provide the frame assembly with a rear "kick-up" so that the rear frame module can mount components such as the rear axle and rear box frame position. The rear "kick-up" provides the needed transition.

Figure 2A:
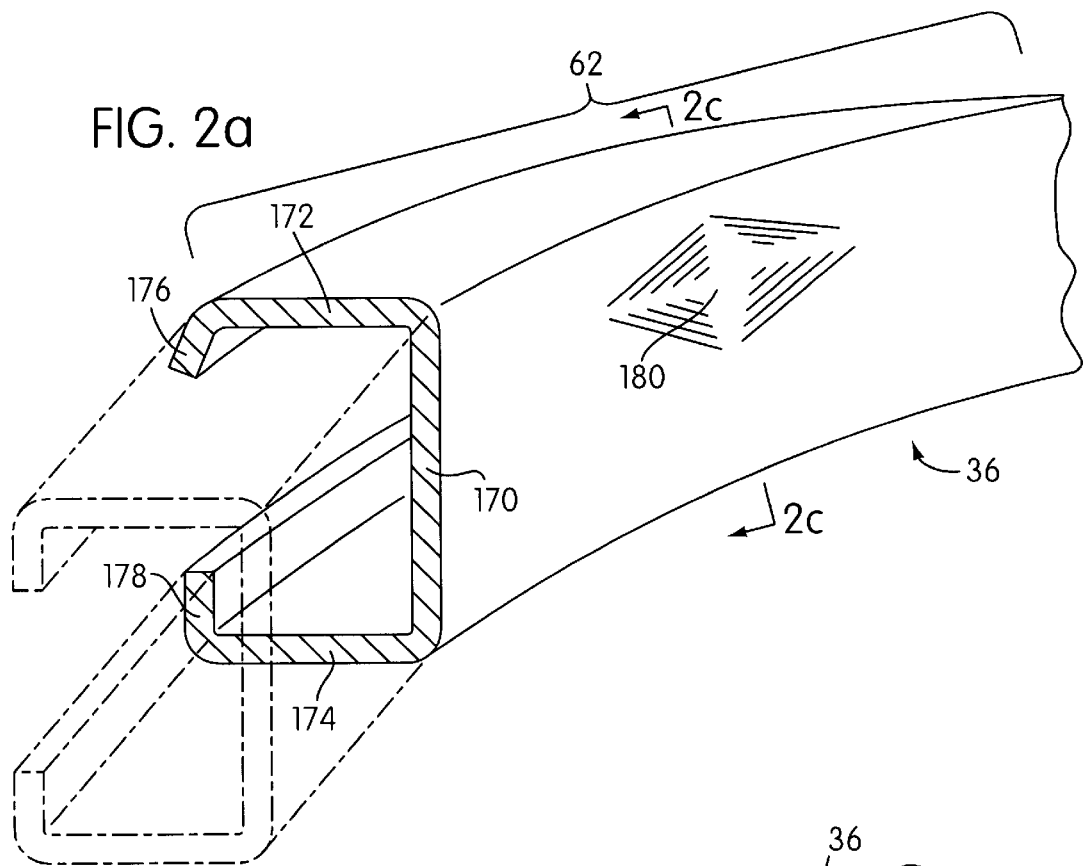
FIG. 2a is partial perspective view, partly in section, showing a bent portion of a central frame siderail of the present invention.

FIG. 2a is an enlarged view of a portion of one central frame rail member 36 at rearward bend 62 thereof. The substantially U-shaped transverse cross-sectional configuration of this frame rail member 36 is shown. The U-shaped configuration comprises a base or vertical wall portion 170, which is substantially vertically disposed when the central frame rail members 36 are assembled into the completed rail frame assembly 10. The U-shaped cross-section further includes a pair of horizontal wall portions or leg portions 172, 174 extending from opposite transverse ends of the vertical wall or base portion 170. The horizontal wall portions 172, 174 are generally parallel to one another and are substantially horizontally disposed when the central rail frame members are assembled into a completed rail frame assembly. The horizontal wall portions 172, 174 extend generally inwardly towards the vehicle, so that, as noted above, the open portion of the U-shaped configuration of each central frame rail member faces inwardly towards the center of the vehicle frame assembly to facilitate mounting of cross members and other components. In FIG. 2a, it can be seen that the U-shaped configuration also includes a pair of vertical flange portions 176, 178 extending towards one another from respective ends of horizontal wall portions 172, 174 opposite the ends connected with base portion 170. These flanges may optionally be omitted.

When the flanges 176, 178 are provided, however, it can be appreciated from the figure that flange 176 extending along the outer portion of the bend is slightly outwardly flared as a result of the bending process. More specifically, as can be appreciated from the dashed line portion of FIG. 2a showing a straight portion of the rail member 36, flange 176 is substantially parallel with vertical wall portion 170 where central rail member 36 is not bent. As also a result of the bending process, it can be appreciated that the grains of metal in horizontal wall member 172 (at the outer portion of the bend) are stretched, while the grains of metal in horizontal wall member 174 (at the inner portion of the bend) are compressed.

Stretching and thinning of the vertical wall portion or base portion 170 also occurs during bending of the central frame rail member. Most of this stretching and thinning occurs towards the upper portion of the vertical wall portion 170 (approximately one third the way down), adjacent the outer bend. As suggested by a generally diamond shaped stretching pattern, generally indicated at 180, most of the stretching of vertical wall portion 180 occurs at a midpoint along the bend 62.

Figure 2B:
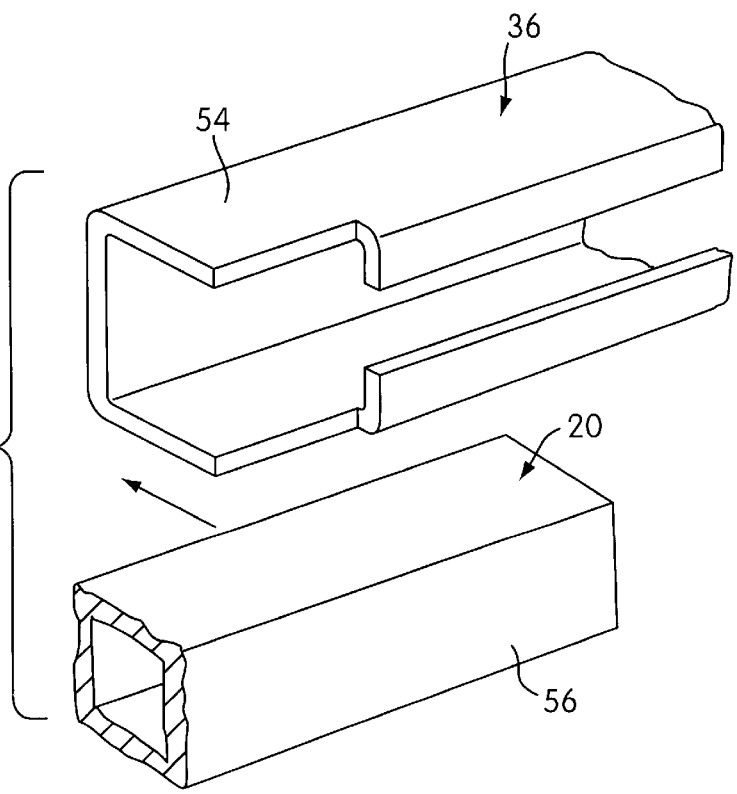
FIG. 2b is a partial perspective view, partly in section, showing a forward end of a central frame siderail and a rearward end of a forward frame siderail of the present invention, and a method for rigidly connecting the same to one another.

In FIG. 2b, the forward end 54 of a central frame rail member 36, and the rearward end 56 of a tubular forward frame rail member 20 are shown. It can be appreciated that where flanges 176 and 178 are provided throughout length of the central frame rail member 36, it is preferable for the rearward end 56 of frame rail member 20 to be telescopingly received within central frame rail member 36 before they are secured (e.g., via welding). Advantageously, however, and as shown in FIG. 2b, flanges 176 and 178 may be removed at forward end portion 54 to enable the U-shaped section to laterally receive the rearward end 56 of rail members 20. It has been found that this greatly facilitates the manufacturing operation.

Figure 2C:
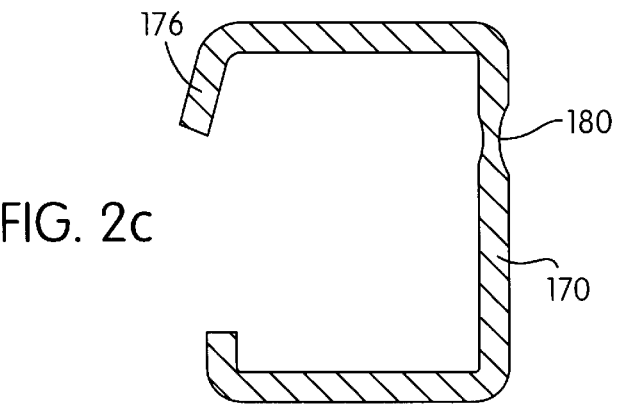
Figure 2D:
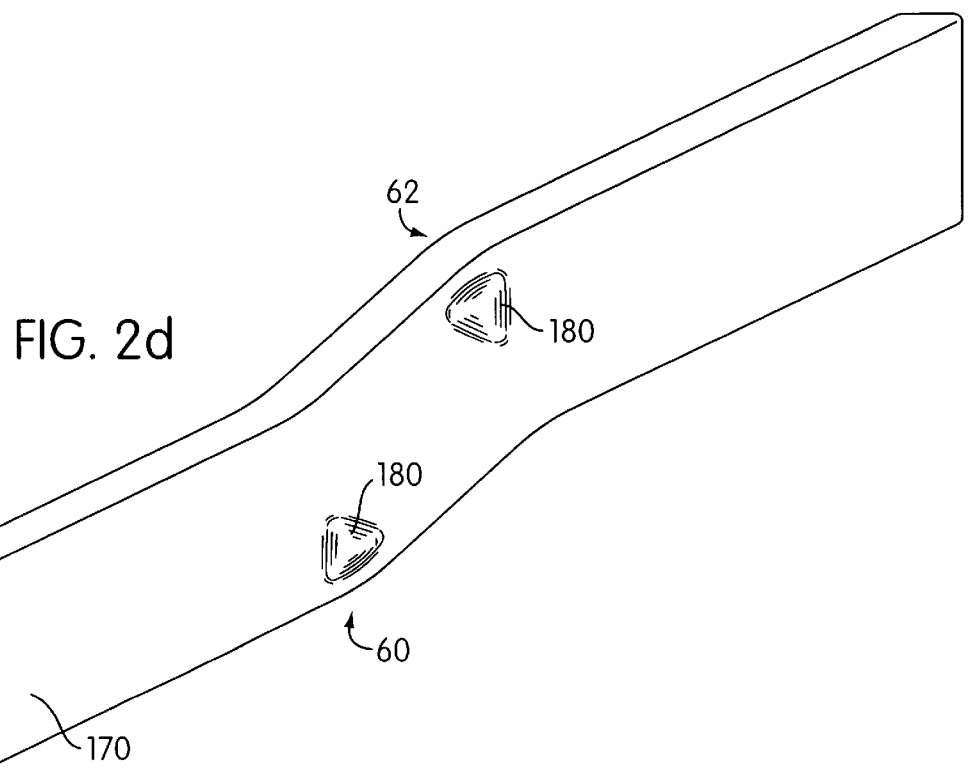
FIG. 2d is a perspective view showing a central frame siderail of the present invention.

FIG. 2c is a cross-sectional view taken along the line 2c—2c in FIG. 2a. This figure shows the thinned portion 180 at the central portion of the bend (60 or 62) in vertical wall portion 170. FIG. 2d is a perspective view showing the central frame rail member, and in particular, highlights the locations of the thin walled portions 180 of the vertical wall portion 170.

Referring now back to FIG. 1, it can be seen that rear frame module 14 includes a pair of parallel rearward frame rail members or siderails 66 interconnected by crossmembers 68, which are adapted to mount or carry a spare tire. The rearward frame rail members 66 have a U-shaped transverse cross section, including a base portion, and a pair of leg portions extending in generally parallel relation to one another from opposite transverse ends of the base portion towards the inner structure of the frame assembly. Forward ends 76 of the rail members 66 are rigidly secured to rearward ends 78 of the central frame rail members 36. Similarly to what has been described with respect to FIG. 2b, forward portion 76 is telescopingly or laterally received within rearward portions of the central frame rail member 36, and then welded in place.

From FIG. 1, it can be appreciated that the forward portion 76 of the rearward frame rail members 66 has a somewhat expanded height in comparison with more rearward portions of the rail member. More particularly, it can be seen that the base portion has a relatively greater length between the transverse ends at the forward portion 76 relative to the length between the transverse ends at more rearward portions. The greater length at the forward transverse end allows each rear frame siderail to be easily fitted to the rear end of a respective one of the central frame siderails. The reduced length or height at more rearward positions advantageously accommodate space limitations for mounting of the rear axle, rear suspension etc., and also reduces the amount of material that is used in the frame construction at areas where the amount of metal can be reduced without compromising structural integrity. This, of course, provides a material cost savings. In order to provide the vertical wall or base portion of the rearward frame rail members 66 with differing height dimensions, it is preferred to form such members 66 in a conventional stamping operation, as it is difficult to provide a rail member with such different dimensions in a rolling process. However, where the rearward frame rail members 66 are to have a substantially constant vertical wall height, a rolling technique may be employed.

The forward frame module 18, central frame module 16, and rearward frame module 14 are preferably each formed as individual units, and then assembled into the completed frame assembly 10. This facilitates assembly. In addition, it can be appreciated that one or more of the modules can be interchanged with modules of different configurations (e.g., with different lengths or bends) for use in different vehicles. This modularity offers substantial savings in manufacturing costs, as each module can potentially be used in several different types of vehicles.

Figure 3:
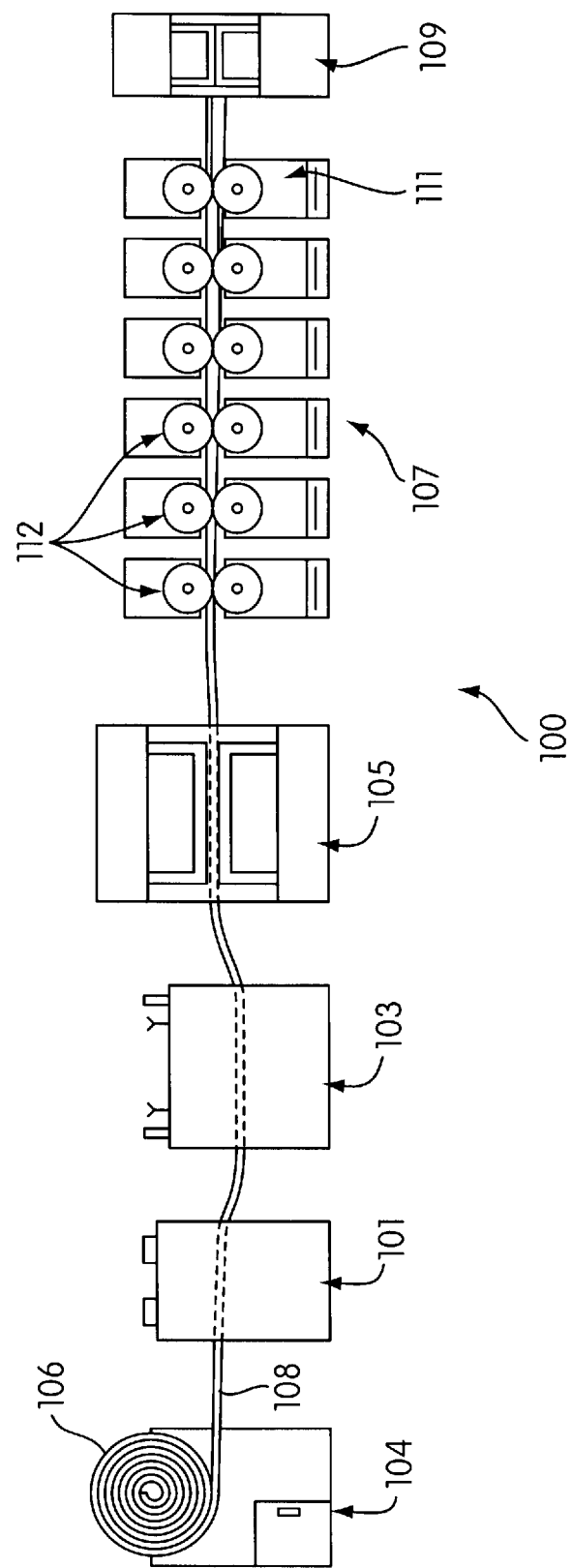
FIG. 3 is a schematic view showing the roll forming apparatus utilized in the present invention.

Referring now to FIG. 3, there is shown a rolling apparatus for forming the central frame rail members 36 of the present invention. The rolling apparatus, generally indicated at 100, includes an uncoiling station 104 for uncoiling large strips or sheets of raw metal material 106, preferably steel. The metal coil is uncoiled so that a flat sheet of material 108 is fed through a series of metal forming devices, including a temper mill 101, a stock straightener 103, a pre-pierce press 105, a rolling mill 107, and a cut-off press 109. The rolling mill 107 includes several pairs of cooperating heavy metal rollers 112. Preferably, the last set of rollers comprises a twisting station 111, which straightens out any twists provided in the roll formed section during formation.

The temper mill 101 accomplishes cold metal reduction before the rolling process. This provides additional strength to the metal, while also reducing its thickness (e.g., by about 5%) to make the frame lighter as a whole, while also enabling the metal to be formed with closer tolerances. The stock straightener 103 flattens the metal sheet to remove any imperfections or inconsistencies in the sheet. The pre-piercing press 105 punches holes required in the central frame rail member for mounting various structures and for securement of the central frame rail member to other frame components. After the metal sheet is rolled into the U-shaped section, a predetermined length of rolled metal is cut by cut-off press 109 to be bent into the desired configuration of the central frame rail member.

Figure 4A:
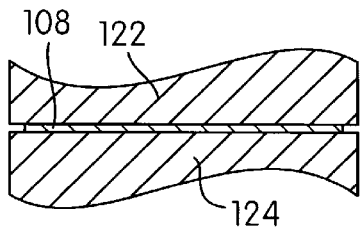
FIGS. 4a–4j are partial sectional views showing heavy metal rollers utilized in the roll forming method of the present invention.
Figure 4B:
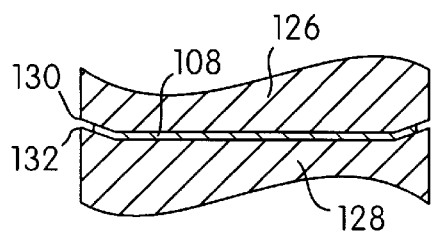
Figure 4C:
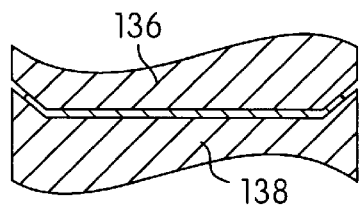
Figure 4D:
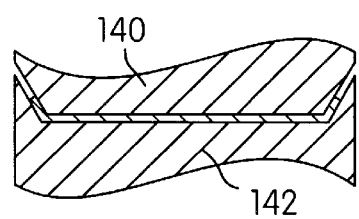
Figure 4E:
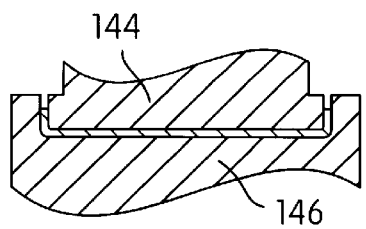
Figure 4F:
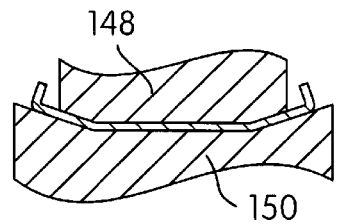
Figure 4G:
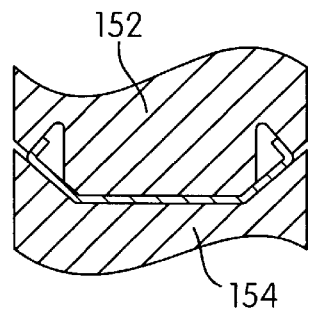

Turning now to FIGS. 4a–4i, there is shown a more detailed view of the succession of pairs of the type of metal rollers 112 used within rolling mill 107 to form the U-shaped central frame rail member 36. More specifically, in FIG. 4a, there is shown a partial sectional view of a first pair of rollers 122 and 124 for initially flattening the sheet of raw material 108 in order to remove any imperfections or inconsistencies which may exist in the raw sheet. In FIG. 4b a first shaping operation is achieved with rollers 126 and 128. As can be appreciated by FIG. 4b, the outer material engaging surface 130 of roller 126 is slightly convex in configuration, while the outer material engaging surface 132 of roller 128 is slightly concave in configuration. These surfaces compress the material sheet 108 therebetween while in rolling engagement with opposite sides of the sheet. In addition to shaping the sheet of raw material, the rolling engagement of each of the rollers also serves to feed the sheet to the next pair of rollers, for example, as those indicated by numerals 136 and 138 in FIG. 4c. In the progression from FIG. 4c to FIG. 4d and then FIG. 4e, it can be appreciated that the cooperating pairs of rollers 136 and 138, 140 and 142, 144 and 146 progressively bend the outer longitudinal portions of sheet 108 to form what will be flanges 176 and 178 at ends of the U-shaped configuration. Then, in FIGS. 4f–4i, it can be seen that a second progression of bends is accomplished by utilizing roller pairs 148 and 150, 152 and 154, 156 and 158, and 160 and 162, until the sheet of material is formed into the final desired configuration.

Figure 4H:
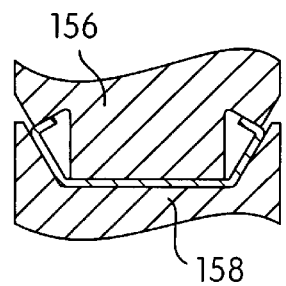
Figure 4I:
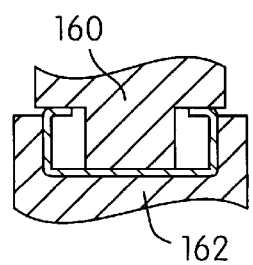
Figure 4J:
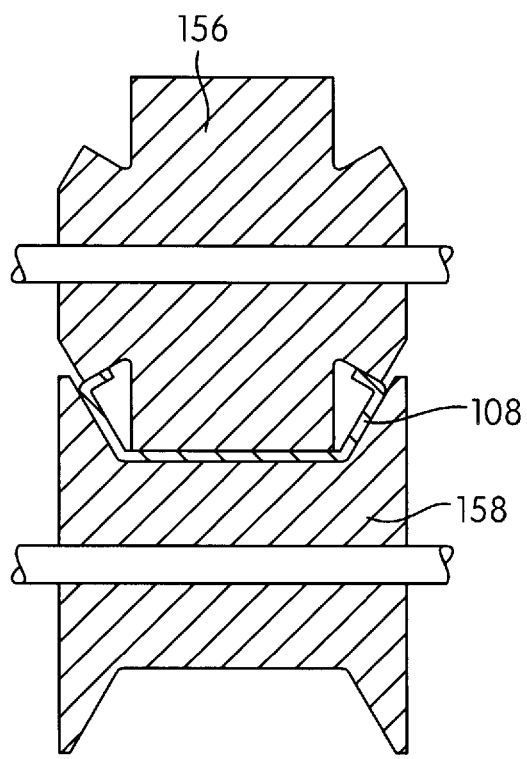

FIG. 4j simply shows a full sectional view of rollers 156 and 158 of FIG. 4h, for further illustrative purposes.

As a result of the process steps illustrated in FIGS. 3 and 4a–4i, it can be appreciated that a substantially continuous U-shaped cross-sectional configuration of metal is formed, the continuous sheet of metal being cut into desired lengths for the central frame rail members 36 in a subsequent cutting procedure (not illustrated). This rolling procedure is highly advantageous over stamping, since an entire roll of material 106 can be processed in continuous fashion without the need to move rail frame sections to and from various stamping stations. In addition, the U-shaped section of the central frame rail members can be more accurately formed by the roll-forming procedure than by stamping, since the progression of bends permits the material to be slowly shaped as desired with each step. While nine rolling steps are shown in the Figures, it can be appreciated that more or less may be used, it being understood that, generally, a more accurately formed section can be accomplished with more steps. For example, in FIG. 3, only six pairs of rollers are shown.

Figure 5A:
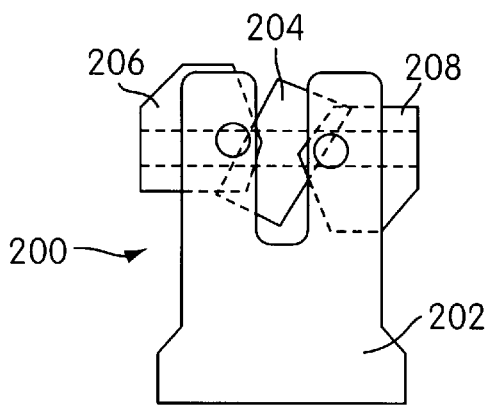
FIGS. 5a–5c are schematic views showing the bending fixture used in a first type of bending operation for bending the central frame siderails in accordance with the principles of the present invention.
Figure 5B:
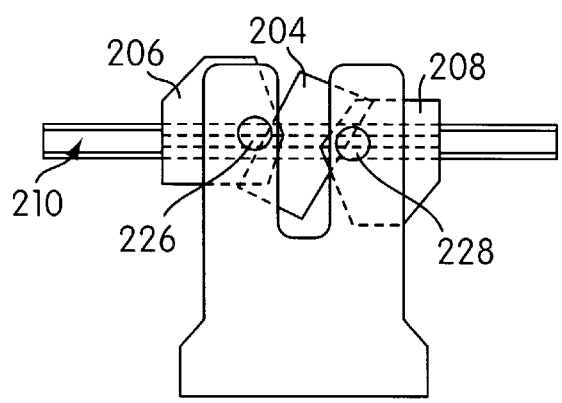
Figure 5C:
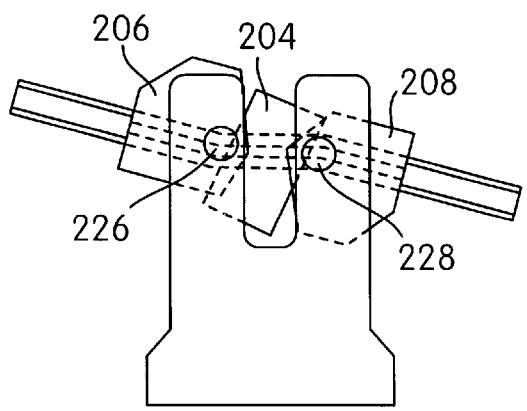
Figure 5D:
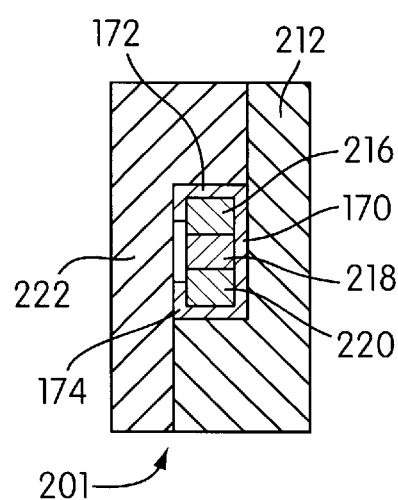
FIG. 5d is a sectional view showing a clamping arrangement for clamping a U-shaped section siderail during the first type of bending operation for bending the central frame siderails in accordance with the principles of the present invention.

In FIG. 5a there is shown a fixture, generally indicated at 200, utilized in bending of the straight roll-formed frame rail member manufactured by the procedure illustrated in FIGS. 3 and 4a–4i. The fixture 200 includes a frame 202, a stationary frame rail support 204, and two bending arms 206 and 208. The fixture 200 is specifically manufactured and adapted to bend U-shaped sections (with or without flanges) of metal having a size, shape, and weight of a typical straight frame rail member. Initially, and as shown in FIG. 5b, the straight frame rail member, generally indicated at 210, is bolted to the stationary support 204 and each bending arm 206 and 208. More specifically, and as illustrated in FIG. 5d, the stationary support and each arm are each provided with a clamping arrangement, generally indicated by 201, which includes a first mount 212 adapted to support the lower horizontal wall portion 174 and vertical wall portion 170 of the straight-formed rail member 210. After the straight roll-formed frame rail is mounted on first mount 212, a plurality of wedges 216, 218 and 220 are inserted into the inner confines of the U-shaped sectional frame rail member. More particularly, outer wedges 216 and 220 are first laterally inserted into the inner confines of the frame-rail member (e.g., moving left to right in FIG. 5d, and then the central wedge 218 is forced between the outer wedges 216, 220, thereby causing the outer wedges 216, 220 to move away from one another into substantially continuous contact with the inner surface of horizontal wall portions 172, 174 and vertical wall portion 170. The leading surface of the central wedge may also contact the inner surface of the vertical wall portion 170. Finally, a second mount 222 is secured behind the wedges to engage the outer surfaces of flange portions 176, 178 and the outer surface of upper horizontal wall portion 172. As a result of this construction, the frame-rail member is substantially captured at all surfaces thereof which are clamped within the fixed support 204 and each arm 206 and 208. The capturing of such surfaces prevents substantial buckling, twisting, or other unwanted deformation of the U-shaped frame-rail member during the bending procedure.

To bend the straight U-section frame rail, the arms 206 and 208 are pivotally forced (in a clockwise direction in FIG. 5c) about respective axes 226 and 228, by hydraulics or other forcing means, to form two longitudinally spaced bends in the frame rail.

It can be appreciated that, as a result of the bending operation illustrated in FIGS. 5a–5d, and as described above with respect to FIG. 2a, the resultant frame-rail member 36 has the metal grains therein substantially altered as a result thereof. More specifically, it can be appreciated that, at outer portions of each bend, the metal grains are stretched to some degree, while at inner portions of each bend, the metal grains are compressed or condensed to some degree. In addition, at each of the longitudinal bends, the vertical wall portion or base portion is bent within its own plane. The grains of metal in the vertical wall portion may be substantially stretched (towards the outer portion of the bend) as well as substantially compressed (towards the inner portion of the bend). All stretching or compression occurs in areas between the spaced positions at each bend at which the rail frame member is bolted and clamped by the respective clamping arrangements 201 carried by the fixed support 204 and arms 206, 208. The stretching and compression of metal, e.g., at the horizontal leg portions 172 and 174, is quite unlike what occurs when a U-section frame-rail member is formed in a stamping operation, since no bending, stretching, or compression of the horizontal or vertical wall portions is performed during stamping.

Referring now to FIGS. 6a–6f, there is shown the method for forming the tubular forward frame rail-members 20 of the forward frame module 18 in accordance with the present invention. As shown in FIG. 6a, a pre-bent tubular blank 300 is inserted between cooperating die halves 302 and 304. The blank can be manufactured by any known process. Preferably, the blank can be formed by rolling a sheet of metallic material into a complete closed tubular section and then seam welding it. Typically, the tubular member 300 is pre-bent mechanically, for example, by use of mandrels in a CNC (computer numerically controlled) bending machine. After the tubular member 300 is inserted into the die, hydroforming ports 308 are engaged with opposite ends 306 of the tubular structure 300, and sealed thereto. As the die halves 302 and 304 are moved towards one another, the tube 300 is slightly crushed, for example into an oval cross-sectional shape, as shown in FIG. 6d.

Next, high pressure water, of up to 10,000 atmospheres is provided through the hydroforming ports 308 and into the inner confines of tubular structure 300. Most preferably 2,000–3,500 atmospheres of pressure is used. This high pressure causes the tubular structure to expand outwardly into engagement with the interior surface 310 defining the cavity within the die. This causes the tubular structure to conform to the shape of the interior surface 310, as shown in FIG. 6f.

As the high pressure fluid is provided into the tubular structure, the hydroforming ports 308 are preferably forced inwardly against the opposite ends 306 of the tube to replenish the wall thickness of the metal as the tube expands into contact with the inner surface 310 of the die. This prevents rupturing of the tube 300 and maintains the wall thickness of the tube within a predetermined range as it expands.

It can be appreciated that during the aforementioned hydroforming process, the amount of metal per unit length of tube is varied (mostly increased). More specifically, as stated above, as the linear exterior circumference is outwardly expanded, the ends of the tube 300 are forced inwardly towards the intermediate portion of the tube so that metal is replenished from the ends of the tube. As a result, the wall thickness is maintained within ±10% of the original blank. In the areas of greatest expansion, the linear exterior circumference is increased by more than 10%, while the wall thickness is maintained within the ±10% range. Thus, in most areas, the amount of metal per unit length is substantially increased. The forward frame rail members preferably have the greatest circumference (the most metal per unit length) at portions where the most strength is required. For example, in FIG. 1, it can be seen that the tubular forward frame rail members 20 have the greatest circumference at a position generally between area defining the forward bent portions for mounting the suspension with control arm bracket 32 and adjacent engine mounting brackets 28.

Figure 7:
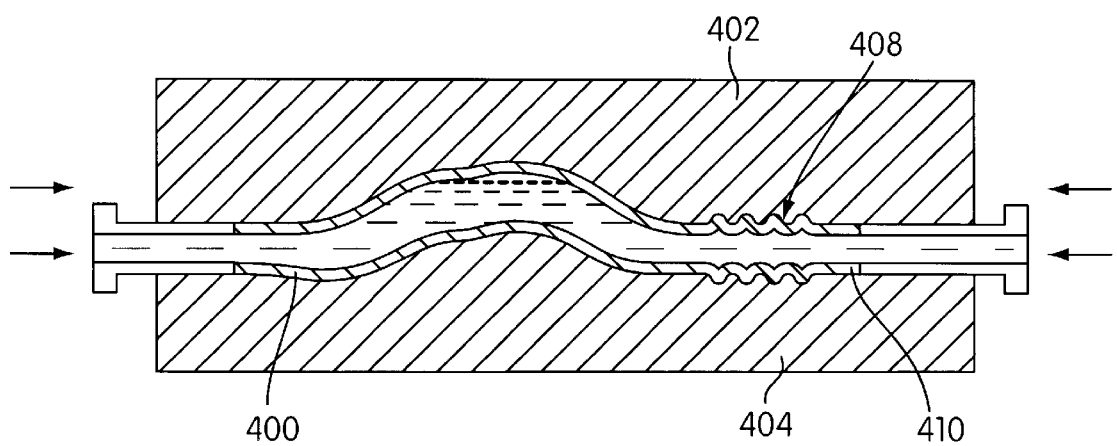
FIG. 7 is a longitudinal sectional view similar to that in FIG. 6e, but showing an alternate embodiment of the present invention.

FIG. 7 is substantially similar to FIG. 6e, but shows an alternate configuration for the hydroforming mold assembly and forward tubular siderail members. More particularly, in FIG. 7 it can be seen that the inner surfaces of the molding cavity have an corrugated configuration or other irregular shape, as generally indicated at 408. This configuration provides the formed tubular member with a shape that causes an axial collapse at near constant forces. As the forward end 410 of the tubular member is eventually connected with the front bumper of the automobile, the arrangement advantageously functions to enhance shock absorbing characteristics of the frame assembly in the event of a forward collision. As can be appreciated from FIGS. 7 and 1, the forward end 410 of the forward frame siderails 20 have a reduced cross-section relative to more rearward portions in order to enhance the shock absorbing characteristics of the siderails 20.

The hydroforming molding technique employed herein is disclosed in greater detail, for example, in "Industrieanzeiger" No. 20 of 9, March 1984; and "Metallumformtechnik", Issue 1D/91, zp. 15 ff: A. Ebbinghaus: "Precision Workpieces in Light Construction, Manufactured Through Internal High Pressure Mouldings"; and "Werkstatt und Betrieb" 123 (1990), 3, P. 241–243: A. Ebbinghaus: "Efficient Designing with Precision Components Formed by the Internal High-Pressure Technique": and "Werkstattt und Betrieb" 122 (1991), 11 (1989), P. 933–938: A. Ebbinghause, "Die-forging with New Technology", the above publications being fully incorporated herein by reference.

Figure 8:
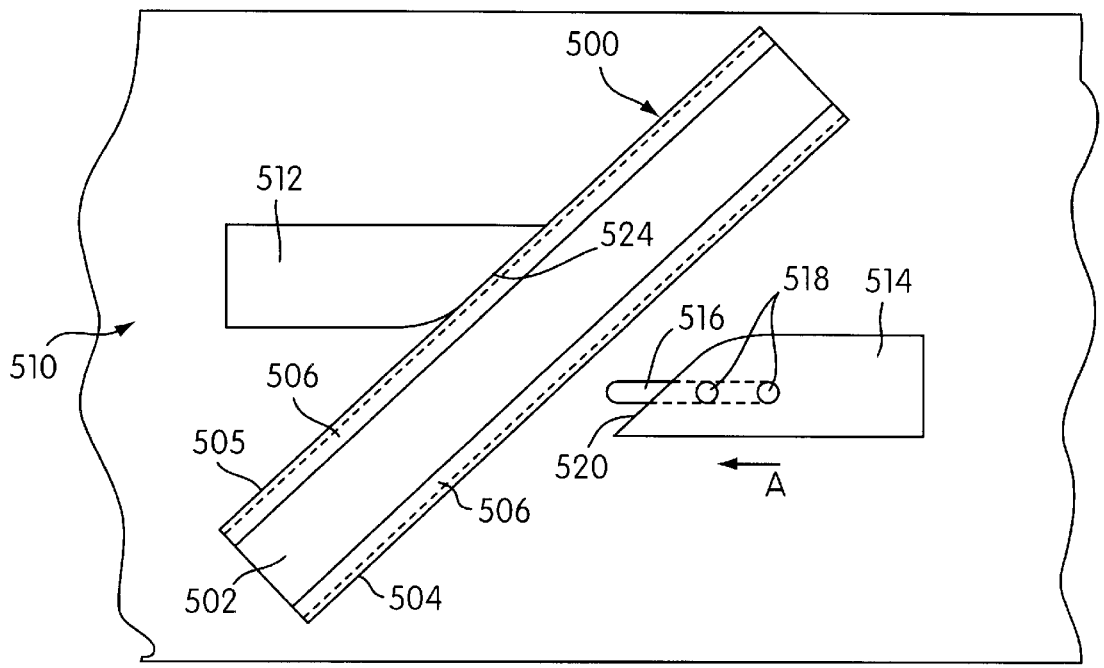
FIG. 8 is a plan view showing a first stage in a second type of bending operation for bending the central frame siderail members in accordance with the principles of the present invention.
Figure 9:
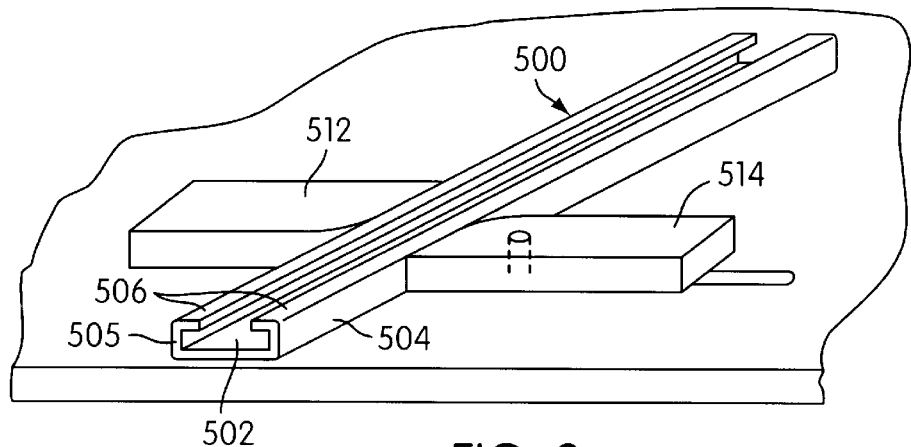
FIG. 9 is a perspective view showing a second stage in the second type of bending operation for bending the central frame siderails in accordance with the principles of the present invention.

Next, another type of bending operation (herein referred to as a "stretch bending" operation) for forming the central frame siderail members in accordance with the principles of the present invention will be described. FIG. 8 shows a first stage of the stretch bending operation used to bend a longitudinal member 500, having a U-shaped cross-sectional configuration, which is to be formed into a central frame siderail in accordance with the principles of the present invention. As can be more fully appreciated from FIG. 9, the longitudinal member 500 comprises a base portion 502 and a pair of leg portions 504, 505 extending in generally parallel relation to one another from opposite transverse ends of the base portion 502. In the example shown, the longitudinal member also includes a pair of flanges 506 extending inwardly towards one another from respective ends of the leg portions 504, 505. Preferably, the longitudinal member 500 is formed in a roll forming operation, such as that illustrated and described with respect to FIGS. 3 and 4a–4j.

Returning now to FIG. 8, it can be seen that the longitudinal member 500 is placed upon a mounting platform, generally indicated at 510, with the lateral opening into the confines of the U-shaped configuration of the longitudinal member 500 facing away from the mounting platform 510, as shown. Mounted on the mounting platform 510 is a fixed rigid member 512, and a movable rigid member 514 disposed in spaced relation from the fixed rigid member 512. The mounting platform 510 is provided with a slot 516 therethrough, and a pair of tightening bolts 518 extend through the slot and are fixed to the movable rigid member 514. The slot 516 enables the bolts 518, and thus the movable rigid member 514 to be moved towards the fixed rigid member 512, as indicated by arrow A, so that a leading surface 520 will engage a surface portion of one of the leg portions 504. At the same time, the leading surface 524 of the fixed rigid member 512 engages a surface portion of the opposite leg portion 505 so that the longitudinal member 500 is sandwiched between the rigid members 512, 514. After the movable rigid member 514 is placed such that the leading surfaces 520 and 524 are in firm engagement with the respective portions of leg portions 504 and 505, the bolt 518 is tightened in appropriate fashion so that the movable rigid member 514 becomes fixed in place on the mounting platform 510. The arrangement wherein the longitudinal member 500 is firmly set in place between the rigid members 512, 514 is shown in the perspective view of FIG. 9.

Figure 10:
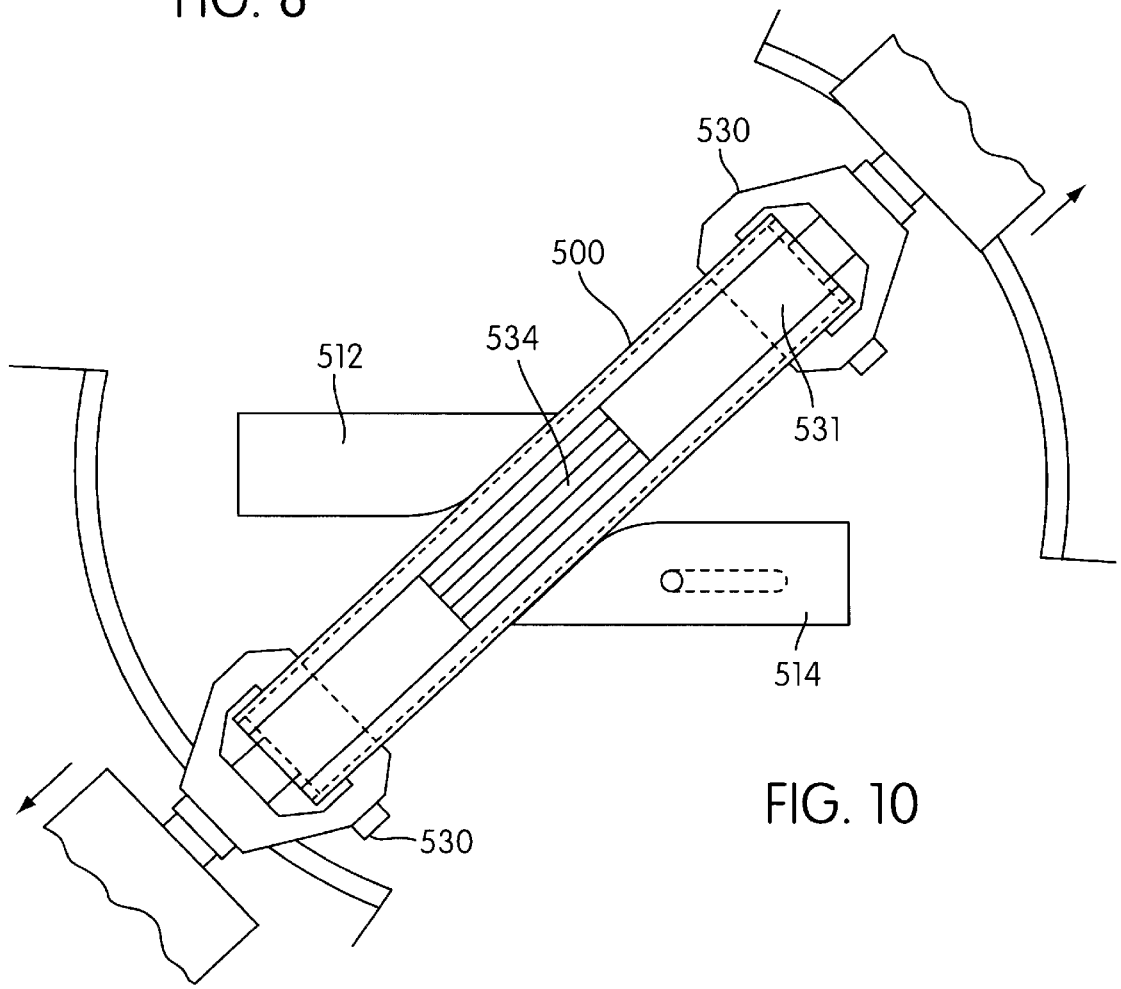
FIG. 10 is a plan view showing a third stage in the second type of bending operation for bending the central frame siderails in accordance with the principles of the present invention.

FIG. 10 is a plan view showing the next stage in the stretch bending operation in accordance with the principles of the present invention. As shown, a pair of jaws or chucks 530 engage the opposite longitudinal ends of the longitudinal member 500. More specifically, the jaws 530 grasp the exterior surfaces at the opposite ends of the longitudinal member 500 by utilizing hydraulically generated force. At the same time, the jaws 530 each provide a rigid metallic insert 531 into the interior confines of the U-shaped cross-sectional configuration through the longitudinal ends of the longitudinal member 500. The inserts 531 expand outwardly into engagement with the inner surface of the U-shaped cross-sectional configuration of the longitudinal member so as to provide internal support at the opposite ends of the longitudinal member. Thus, during the hydraulically applied force for grasping the ends of the longitudinal member 500, the jaws 530 do not crush or significantly bend to any extent the ends of the longitudinal member 500.

After the jaws 530 have firmly grasped the opposite ends of longitudinal member 500, they are moved in opposite directions with respect to the longitudinal extent of the longitudinal member 500, as indicated by the arrows in FIG. 10. This movement of the jaws 530 causes the longitudinal member 500 to be longitudinally stretched. The jaws 530 are hydraulically activated, and are connected with a transducer circuit which enables the stress/strain of the longitudinal member 500 to be plotted via a computer. The longitudinal member 500 continues to be stretched until the stress/strain line becomes non-linear (i.e., stretched to what is known in the art as the "yield state"). This substantially rids the metallic grains forming the longitudinal member 500 of the memory retained therein. The stress/strains of the longitudinal members preferably continues to be monitored throughout the stretch bending operation so that it is maintained in the yield state.

It is preferred that, prior to the jaws 530 being brought into engagement with the opposite ends of the longitudinal member 500, flexible member nylon strips 534 be inserted within the confines of the U-shaped cross-sectional configuration, generally at a location of the longitudinal member which is to be bent during a bending about to be described. Such nylon strips provide internal support to the longitudinal member during bending. As an alternative form of support, a flexible metal chain snake can be inserted longitudinally into the confines of the longitudinal member at the area to be bent. The snake can be expanded outwardly into engagement with the inner surface of the U-shaped cross-sectional configuration once it has been positioned at the area to be bent. The snake provides internal support, in similar fashion to the nylon strips, in order to prevent inward crushing of the longitudinal member 500 during bending.

Figure 11:
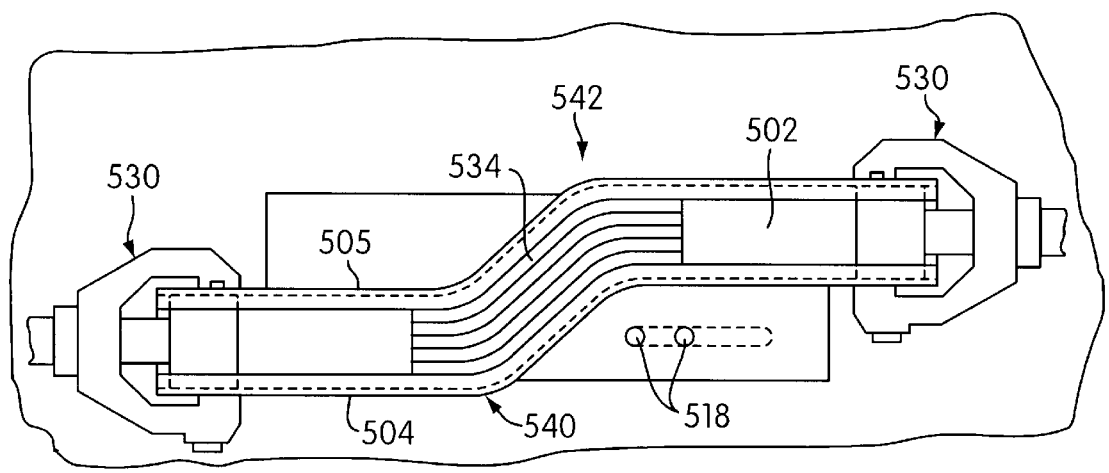
FIG. 11 is a plan view showing a fourth stage in the second type of bending operation for bending the central frame siderails in accordance with the principles of the present invention.

FIG. 11 shows a longitudinal member 500 after the bending step of the stretch bending operation has taken place. As will be apparent from the figures, the jaws 530 are both moved in generally arcuate paths, in generally the same circular direction. As a result, the longitudinal member 500 is provided with two longitudinally spaced bends, generally indicated at 540 and 542. The first bend 540 has the base portion 502 thereat bent generally within its plane, one of the leg portions 504 thereat extending from one transverse end of the base portion being stretched, and an opposite one of the leg portions 505 extending from an opposite transverse end of the base portion 502 being substantially compressed. At the second of the bends 542, the base portion 502 thereat is also bent generally within its plane, but in a generally opposite direction from that at bend 540. In addition, the leg portion 504 extending from the aforementioned one transverse end of the base portion 502 is compressed at this second bend 542, while the opposite leg portion 505 extending from the opposite transverse end of the base portion 502 is stretched. It should be noted that the areas of the respective leg portions 504, 505 which are compressed generally conform to the curved configuration of the engaged surfaces of the rigid members 512 and 514 at such bends.

During the bending by the arcuate movement of the jaws 530, the computer continues to monitor the stress/strain of the longitudinal member 500 and provides feedback to the jaws 530 to effect slight in and out movements of the jaws to maintain the longitudinal member 500 in the yield state preferably through the entire bending operation.

After the longitudinal member 500 is bent into the desired configuration, the arcuate movement of the jaws 530 stops. After the jaws stop, a post-stretch is preferably performed. More particularly, the jaws 530 will once again extend in generally opposite longitudinal directions to further slightly stretch the longitudinal member 500 to set the form of the longitudinal member 500.

As a result of the stretch bending operation, it has been found that on the compression side of the bend, i.e., at leg portion 505 at the first bend 540, and at the leg portion 504 at the second bend 542, the leg portion has a tendency to be bent slightly outwardly away from the opposite leg portion. It has also been found that at the tension or stretched side of the bend, i.e., at leg portion 504 at the first bend 540 and at leg portion 505 at the second bend 542, the center of the leg portion becomes bent slightly inwardly into the confines of the U-shaped configuration so as to have somewhat of a concave external appearance. At the same time, the flange portion 506 connected with this concave-shaped leg portion tends to bend slightly outwardly. In order to prohibit the longitudinal member from being bent slightly out of its desired U-shaped cross-sectional configuration at the bends 540, 542, it is preferable to use cam followers (not shown) at the stretched portions of the bends. A first cam follower engages the exterior surface of the leg portion 505 at bend 542 and a second cam follower engages the exterior surface of the leg portion 504 at the bend 540 in order to prevent the U-shaped section from laying open.

The aforementioned stretch bending operation as illustrated and described in conjunction with FIGS. 8–11 can be accomplished with an apparatus somewhat similar to that shown and described in U.S. Pat. No. 4,815,308, hereby incorporated by reference.

After the central frame siderails are formed in the aforementioned method, the forward frame module and the rearward frame module are rigidly secured to opposite ends of these siderails. More particularly, this is accomplished by securing a forward end of each of the central frame siderails with a rear end of a respective one of the forward frame siderails, and by securing the rearward end of each of the central frame siderails with a front end of a respective one of the rear frame siderails. This arrangement is depicted in FIG. 1. Preferably, the forward frame module comprises a pair of laterally spaced longitudinally extending front frame siderails that are formed in accordance with the hydroforming procedures noted above. In addition, the rearward frame module comprises a pair of laterally based longitudinally extending rear frame siderails which are preferably formed by a stamping operation wherein a sheet of metallic material is placed between cooperative stamping dies. The stamping dies are constructed and arranged to compressibly engage opposite sides of the sheet therebetween so as to bend the sheet into a configuration having a generally U-shaped transverse cross-section including a base portion and a pair of generally parallel leg portions extending from opposite ends of the base portion.

Figure 12:
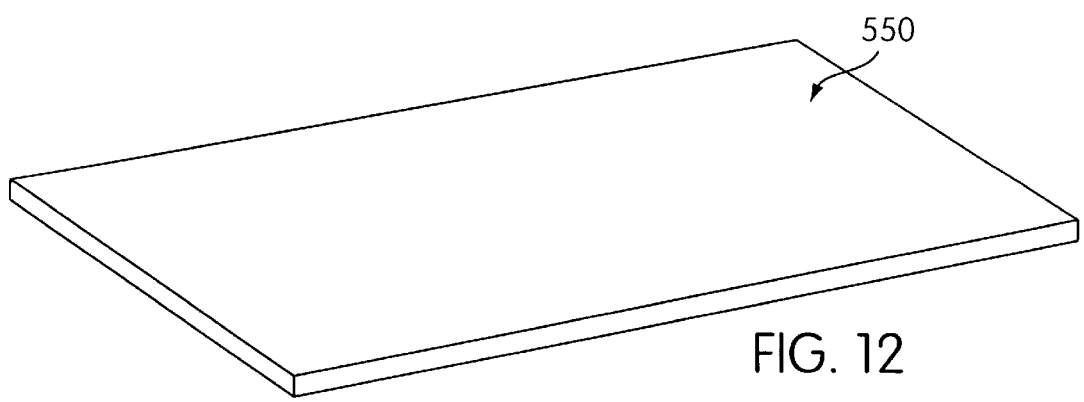
FIG. 12 is a perspective view of a sheet of metal used in an alternate method for forming the central frame siderail in accordance with the principles of the present invention.
Figure 13:
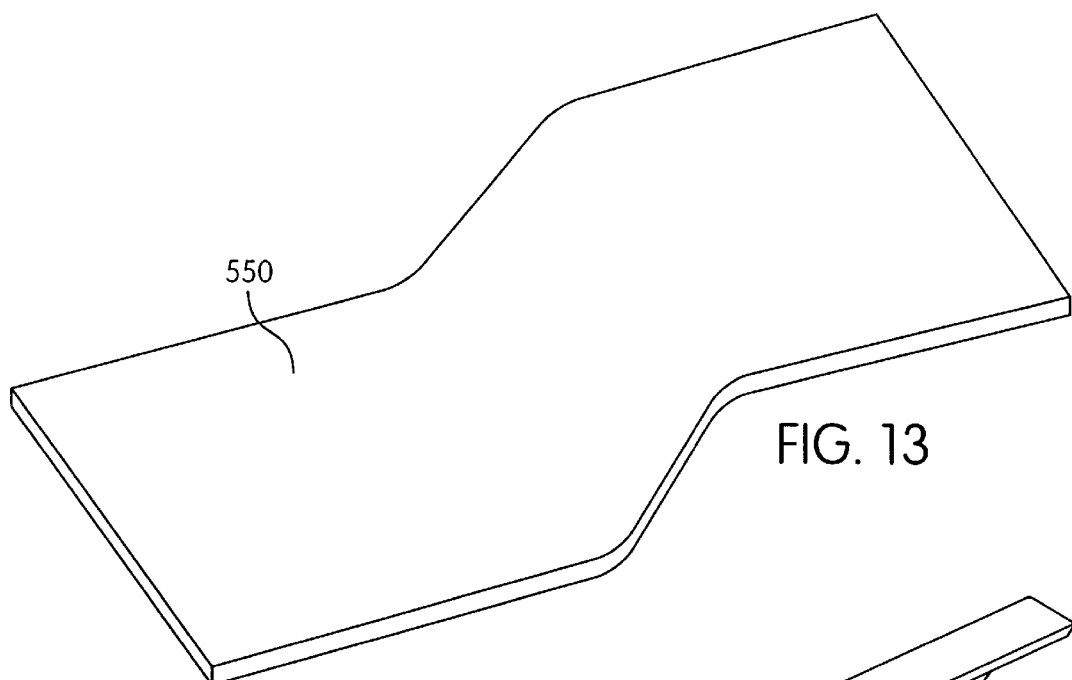
FIG. 13 is a plan view showing the sheet of metal depicted in FIG. 12 after it has been bent in an edge-bending operation in accordance with the principles of the present invention.

FIG. 12 is perspective view of an elongate planar sheet of metallic material, generally indicated at 550, utilized in an alternate method for forming central frame siderails in accordance with the present invention. In accordance with this method the central frame siderails are constructed by bending the elongate planar sheet of metallic material transversely within its plane at two longitudinally spaced positions so that it takes the configuration shown in FIG. 13. This can be accomplished by utilizing a known edge-bending technique, for example, such as that set forth in U.S. Pat. No. 3,908,435, hereby incorporated by reference.

Figure 14:
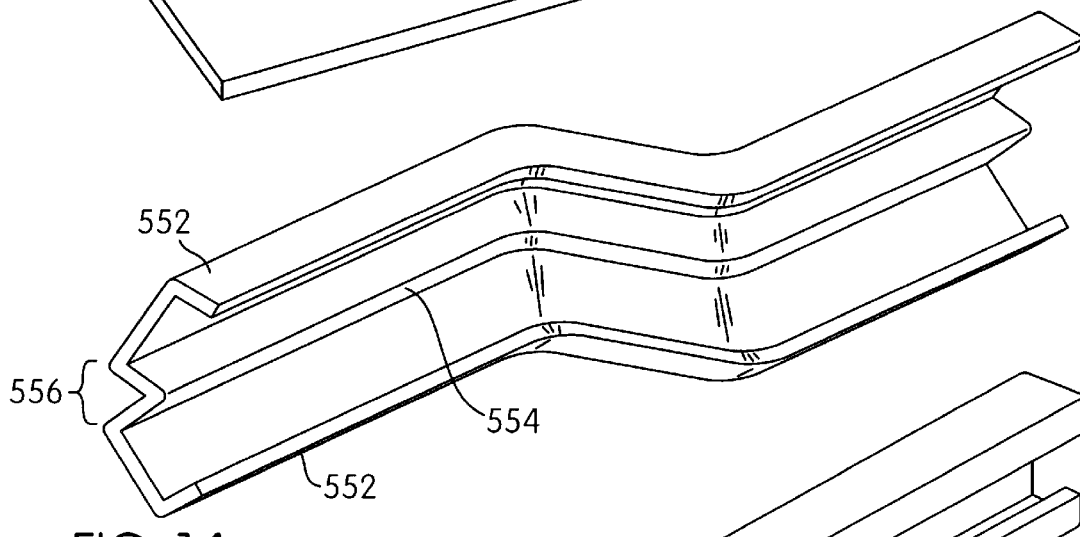
FIG. 14 is a perspective view of the sheet of metal shown in FIG. 13 after it has been stamped into an intermediate configuration in forming one of the side central frame siderail members in accordance with the principles of the present invention.
Figure 15:
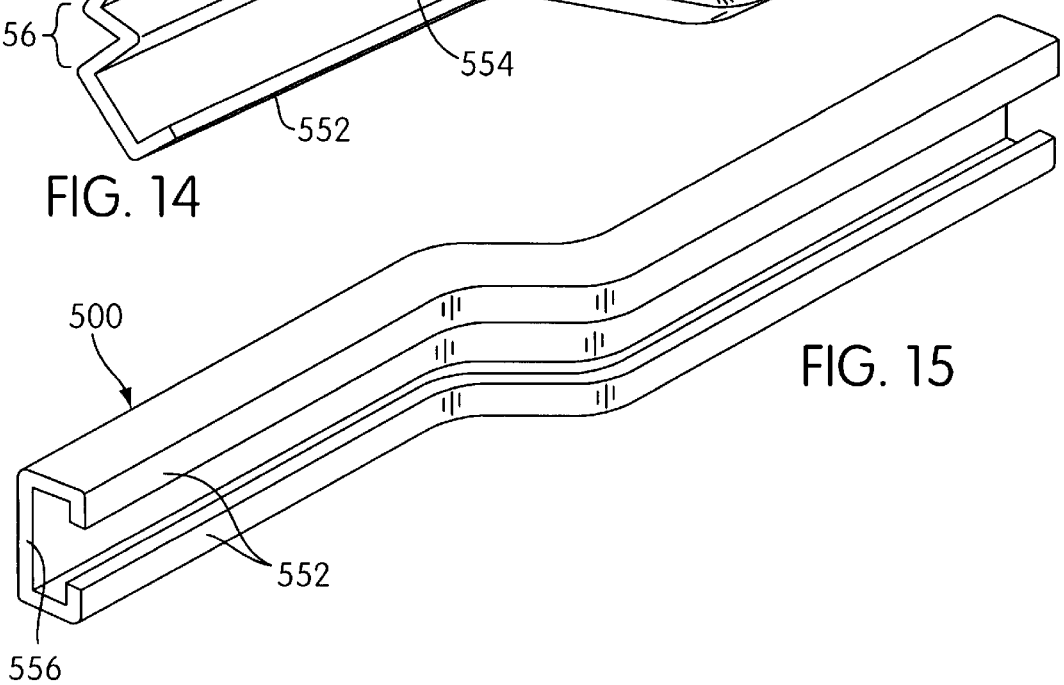
FIG. 15 is a perspective view showing a finalized central frame siderail member manufactured in accordance with the alternate method shown in FIGS. 12–14 for forming the central frame siderail in accordance with the principles of the present invention.

After the sheet is bent within its plane as aforementioned, it is then placed between cooperative stamping dies, which compressively engage opposite sides of the planar sheet and progressively form the sheet into a longitudinal member having a generally U-shaped transverse cross-section. In the instance in which flanges 552 are to be provided, it is preferable to shape the sheet of metallic material into somewhat of a W-shaped cross-sectional configuration, as depicted in FIG. 14, in a preliminary stamping sequence. In the final stamping operation, the longitudinal central bend line 554 is removed to form the base portion 556, as shown in FIG. 15. In accordance with this method, because the edge-bending technique permits a straight sheet of planar raw material to be used completely (i.e., it is not necessary to stamp out the "S" shaped planar metal sheet shown in FIG. 13 from a larger sheet of raw material), a stamping operation can be employed that doesn't require scrap material to be wasted.

Figure 16:
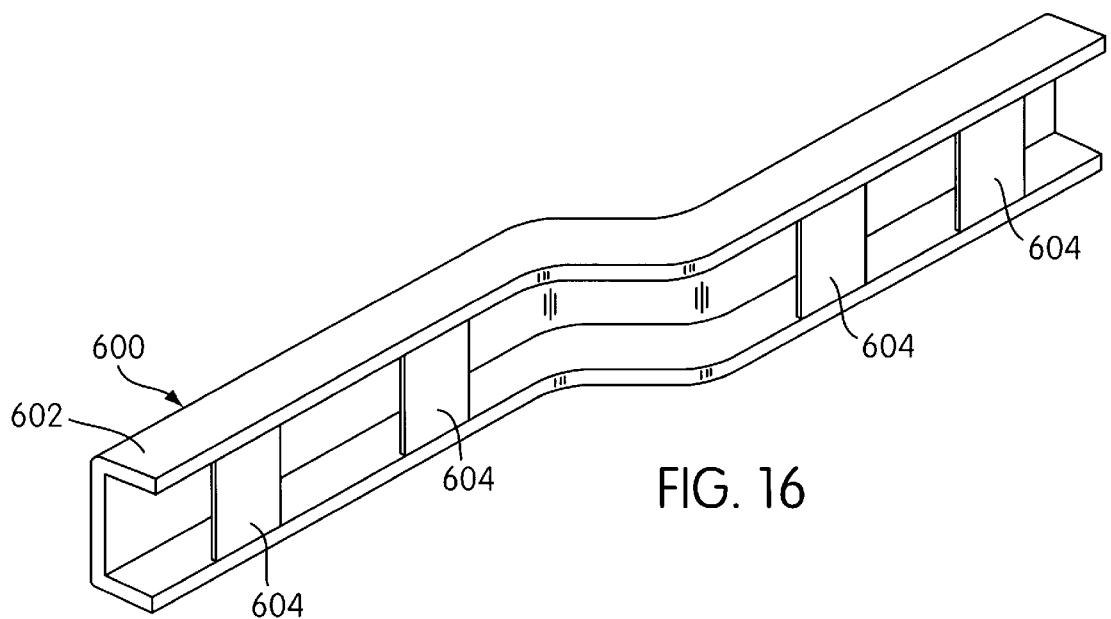
FIG. 16 is a perspective view showing an alternate finalized central frame siderail member manufactured in accordance with the present invention.

In FIG. 16, there is shown an alternate finalized central frame siderail member 600 manufactured in accordance with any known methods, including but not limited to the methods set forth herein. In FIG. 16, it can be seen that the central frame member 600 has a main portion 602 U-shaped cross-section without any flanges as contemplated herein. Instead, a plurality of support members 604, preferably in the form of rectangular or square plates, are provided at longitudinally spaced positions on each of the central frame siderails. The support members are formed separately from the central frame siderail and connected, preferably by welding, between the leg portions. It is preferable that the plate extend in a plane that is longitudinally disposed relative to the frame assembly and be connected between terminal edge portions of the respective leg portions. It has been found that the use of such support members significantly reduces the thickness of the metal that needs to be used in the main portion 602 of the central frame member for structural rigidity and to inhibit breathing of the U-shaped cross-sectional configuration. This construction is also advantageous because using less metal in the main portion 602 facilitates bending thereof.

While the invention has been illustrated and described in detail in the drawings and foregoing description, the same is to be considered as illustrative and not limiting in character, it being understood that only the preferred embodiments have been shown and described. Therefore, this invention includes all modifications encompassed within the spirit and scope of the following claims.

What is claimed is:

1. A frame assembly for a motor vehicle comprising:
   a rearward frame module having a pair of generally parallel longitudinally extending rearward frame siderails;
   a forward frame module comprising a pair of generally parallel tubular forward frame siderails; and
   a central frame module comprising a pair of generally parallel longitudinally extending central frame siderail siderails each having a generally U-shaped transverse cross-sectional configuration including a base portion and a pair of generally parallel leg portions extending from opposite transverse ends of said base portion, said U-shaped central frame siderails each being bent at two longitudinally spaced locations so that
   1) at a first of said locations
      a) said base portion is bent generally within its plane,
      b) one of said leg portions extending from one transverse end of the base portion is substantially stretched longitudinally, and
      c) an opposite one of said leg portions extending from an opposite transverse end of said base portion is substantially compressed longitudinally, and so that
   2) at a second of said locations
      a) said base portion is bent generally within its plane,
      b) said one of the leg portions extending from one end of said base portion is substantially compressed longitudinally, and
      c) said opposite one of said leg portions extending from said opposite transverse end of said base portion is substantially stretched longitudinally;
      said central frame module having respective forward ends of each of said central frame siderails connected with respective rear ends of each of said forward frame siderails and having respective rearward ends of each of said central frame siderails connected with respective forward ends of said rearward frame siderails.

2. A frame assembly for a motor vehicle according to claim 1, wherein said base portion comprises metallic grains stretched at each of the bends at said two longitudinally spaced positions, said base portion having said grains being stretched to a greater extent at areas thereof adjacent the stretched areas of the leg portions relative to areas thereof adjacent the compressed areas of the leg portions.

3. A frame assembly for a motor vehicle according to claim 2, wherein a maximum amount of stretching of said base portion at each of said bends is disposed generally at a midpoint between said two spaced positions defining the extremities of each bend.

4. A frame assembly for a motor vehicle according to claim 1, wherein said forward frame siderails of said forward frame module each have at least one forward portion thereof provided with a reduced transverse cross-section relative to rearward portions thereof so as to enhance shock absorbing characteristics of said forward frame members.

5. A rail frame assembly according to claim 1, wherein said forward frame siderails each have a generally rectangular transverse cross-section.

6. A frame assembly according to claim 1, wherein each said U-shaped central frame siderail further comprises a pair of flange portions each extending from respective ends of said leg portions opposite said base portion.

7. A frame assembly according to claim 6, wherein said flange portions are generally parallel to said base portion at a location outside of the bends at said two longitudinally spaced positions, and wherein one of said flange portions is bent slightly away from said base portion at the bends at said two longitudinally spaced positions.

8. A frame assembly according to claim 7, wherein said forward frame module and said rearward frame module are rigidly secured to opposite ends of said central frame module.

9. A frame assembly according to claim 8, wherein said central frame siderails are substantially devoid of said flange portions at forward ends thereof.

10. A frame assembly according to claim 1, wherein an amount of metal per unit length of each of said tubular forward frame siderails varies at different positions along a longitudinal extent thereof.

11. A frame assembly according to claim 10, wherein the linear exterior circumference of each of said tubular forward frame siderails is expanded in a predetermined portion thereof by an amount greater than 10% relative to other portions thereof while maintaining a wall thickness within ±10% of said other portions.

12. A frame assembly according to claim 11, wherein the said tubular forward frame siderails have bent portions between ends thereof adapted for mounting a vehicle suspension, and wherein the predetermined portion of said tubular forward frame siderails expanded by an amount greater than 10% is disposed generally between areas defining said bent portions.

13. A frame assembly according to claim 1, wherein said central frame siderails each further comprise a plurality of associated support members formed separately therefrom, said support members being connected to and extending between the leg portions of the associated central frame siderails at longitudinally spaced locations of the associated central frame siderails to inhibit flexure of said central frame siderails.

* * * * *